(12) United States Patent
Altonen et al.

(10) Patent No.: US 11,621,133 B2
(45) Date of Patent: Apr. 4, 2023

(54) CONTROL DEVICE CONFIGURED TO PROVIDE VISUAL FEEDBACK

(71) Applicant: Lutron Technology Company LLC, Coopersburg, PA (US)

(72) Inventors: Gregory S. Altonen, Easton, PA (US); Chris Dimberg, Easton, PA (US); Jason C. Killo, Emmaus, PA (US); Matthew Knauss, Macungie, PA (US); Michael W. Pessina, Allentown, PA (US); Daniel L. Twaddell, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/588,409

(22) Filed: Jan. 31, 2022

(65) Prior Publication Data
US 2022/0157541 A1 May 19, 2022

Related U.S. Application Data

(63) Continuation of application No. 17/073,014, filed on Oct. 16, 2020, now Pat. No. 11,264,187, which is a
(Continued)

(51) Int. Cl.
*H05B 47/00* (2020.01)
*H01H 19/02* (2006.01)
(Continued)

(52) U.S. Cl.
CPC .......... *H01H 19/025* (2013.01); *H01H 19/14* (2013.01); *H01H 19/54* (2013.01); *H05B 47/105* (2020.01); *H05B 47/175* (2020.01)

(58) Field of Classification Search
CPC ...... H01H 19/025; H01H 19/14; H01H 19/54; H05B 47/105; H05B 47/175
See application file for complete search history.

(56) References Cited

U.S. PATENT DOCUMENTS 4,291,211 A * 9/1981 Discenza ............. H01H 21/025
200/311
5,248,919 A 9/1993 Hanna et al.
(Continued)

FOREIGN PATENT DOCUMENTS

CN 2596671 Y 12/2003
WO 2014179531 A2 11/2014

*Primary Examiner* — Kurtis R Bahr
(74) *Attorney, Agent, or Firm* — Flaster Greenberg, P.C.

(57) ABSTRACT

A control device configured for use in a load control system to control an external electrical load may provide simple feedback regarding the operation of the control device. For example, the control device may comprise a base portion configured to be mounted to an electrical wallbox or over a mechanical switch, and a control unit connected to the base portion. The control unit may comprise a rotation portion rotatable with respect to the base portion, an actuation portion, and a light source. The control unit may be configured to control the light source to illuminate at least an illuminated portion of the actuation portion in response to actuations of the rotation portion and the actuation portion. In addition, the control unit may provide a limit indication on the illuminated portion by blinking the illuminated portion when the electrical load has reached a limit.

24 Claims, 22 Drawing Sheets

Related U.S. Application Data continuation of application No. 16/567,922, filed on Sep. 11, 2019, now Pat. No. 10,910,176.

(60) Provisional application No. 62/846,275, filed on May 10, 2019, provisional application No. 62/729,810, filed on Sep. 11, 2018.

(51) Int. Cl.
| | |
|---|---|
| *H05B 47/175* | (2020.01) |
| *H05B 47/105* | (2020.01) |
| *H01H 19/14* | (2006.01) |
| *H01H 19/54* | (2006.01) |

(56) References Cited

U.S. PATENT DOCUMENTS

| | | |
|---|---|---|
| 5,264,761 A | 11/1993 | Johnson et al. |
| 7,834,856 B2 | 11/2010 | Grinshpoon et al. |
| 8,009,042 B2 | 8/2011 | Steiner et al. |
| 8,199,010 B2 | 6/2012 | Sloan et al. |
| 8,212,486 B2 | 7/2012 | Biery et al. |
| 8,228,184 B2* | 7/2012 | Blakeley ............ G08B 29/181 340/541 |
| 8,330,638 B2 | 12/2012 | Altonen et al. |
| 8,410,706 B2 | 4/2013 | Steiner et al. |
| 8,451,116 B2 | 5/2013 | Steiner et al. |
| 8,471,779 B2 | 6/2013 | Mosebrook |
| 8,950,461 B2 | 2/2015 | Ogden et al. |
| 9,115,537 B2 | 8/2015 | Blair |
| 9,208,965 B2 | 12/2015 | Busby et al. |
| 9,368,025 B2 | 6/2016 | Carmen |
| 9,418,802 B2 | 8/2016 | Romano et al. |
| 9,520,247 B1 | 12/2016 | Finnegan et al. |
| 9,583,288 B2 | 2/2017 | Jones et al. |
| 9,679,696 B2 | 6/2017 | Bhutani et al. |
| 9,799,469 B2 | 10/2017 | Bailey et al. |
| 9,959,997 B2 | 5/2018 | Bailey et al. |
| 10,027,127 B2 | 7/2018 | Crafts et al. |
| 10,271,407 B2 | 4/2019 | Pessina et al. |
| 2005/0152128 A1* | 7/2005 | Campman ............ F21S 8/035 362/95 |
| 2008/0111491 A1 | 5/2008 | Spira et al. |
| 2010/0007508 A1* | 1/2010 | Nearhoof ............ H05B 39/086 340/815.73 |
| 2011/0140548 A1* | 6/2011 | Hakkarainen ........ H05B 39/085 307/157 |
| 2012/0286940 A1 | 11/2012 | Carmen et al. |
| 2012/0292174 A1 | 11/2012 | Mah et al. |
| 2013/0030589 A1* | 1/2013 | Pessina ............ G05B 15/02 700/295 |
| 2014/0117871 A1 | 5/2014 | Swatsky et al. |
| 2015/0077021 A1 | 3/2015 | Mccarthy et al. |
| 2015/0371534 A1* | 12/2015 | Dimberg ............ G08C 17/02 340/12.5 |
| 2016/0073479 A1 | 3/2016 | Erchak et al. |
| 2017/0105176 A1 | 4/2017 | Finnegan et al. |
| 2017/0278383 A1 | 9/2017 | Dimberg et al. |
| 2017/0280533 A1* | 9/2017 | Dimberg ............ G08C 17/02 |
| 2017/0354011 A1 | 12/2017 | Dimberg et al. |
| 2017/0354012 A1 | 12/2017 | Bard et al. |
| 2017/0354022 A1 | 12/2017 | Dimberg et al. |
| 2017/0354023 A1 | 12/2017 | Dimberg et al. |
| 2018/0114434 A1 | 4/2018 | Newman et al. |
| 2018/0116039 A1 | 4/2018 | Harte et al. |
| 2018/0116040 A1 | 4/2018 | Mann et al. |
| 2018/0137837 A1* | 5/2018 | Peana .................. H05B 47/00 |
| 2018/0190451 A1 | 7/2018 | Scruggs |

* cited by examiner

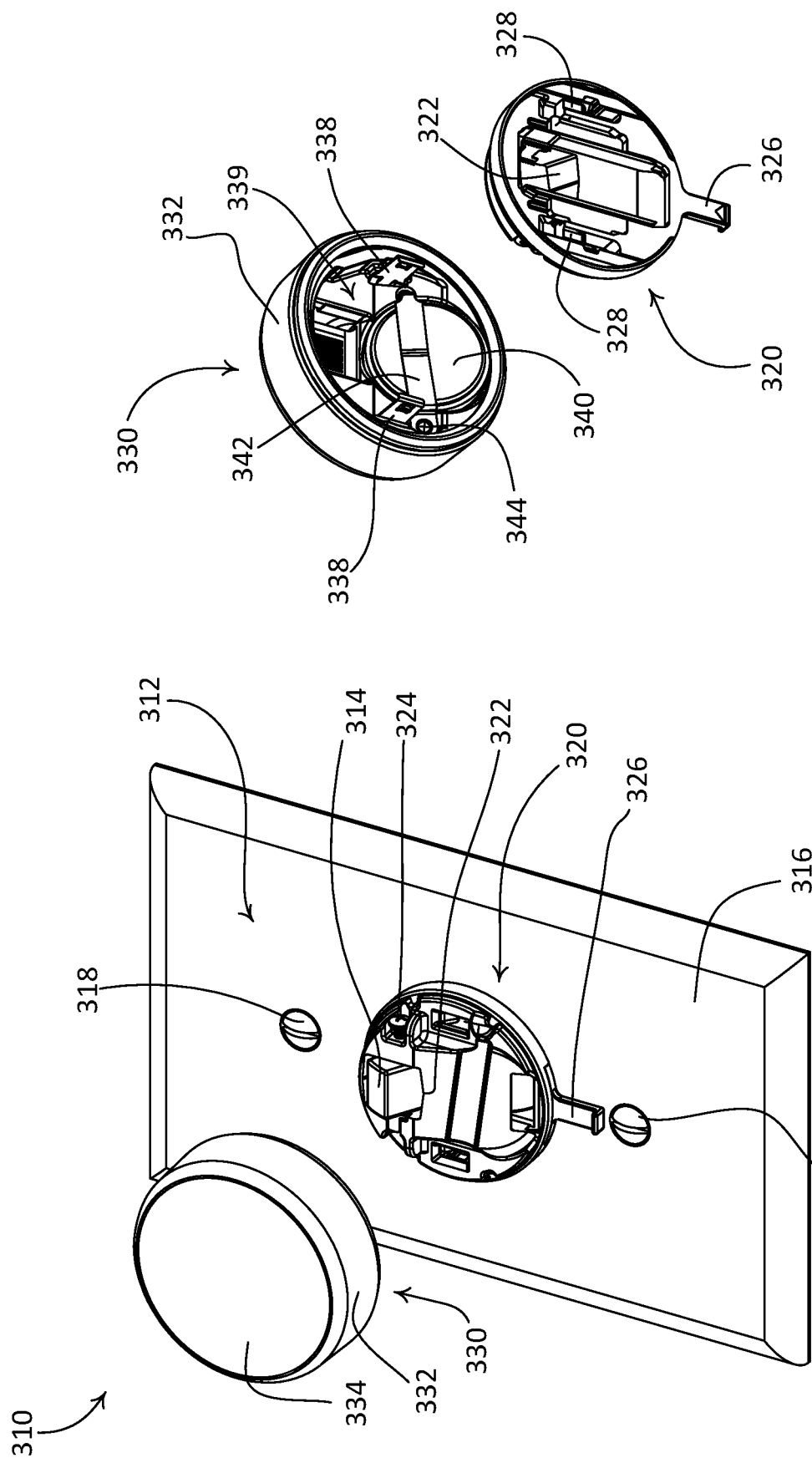

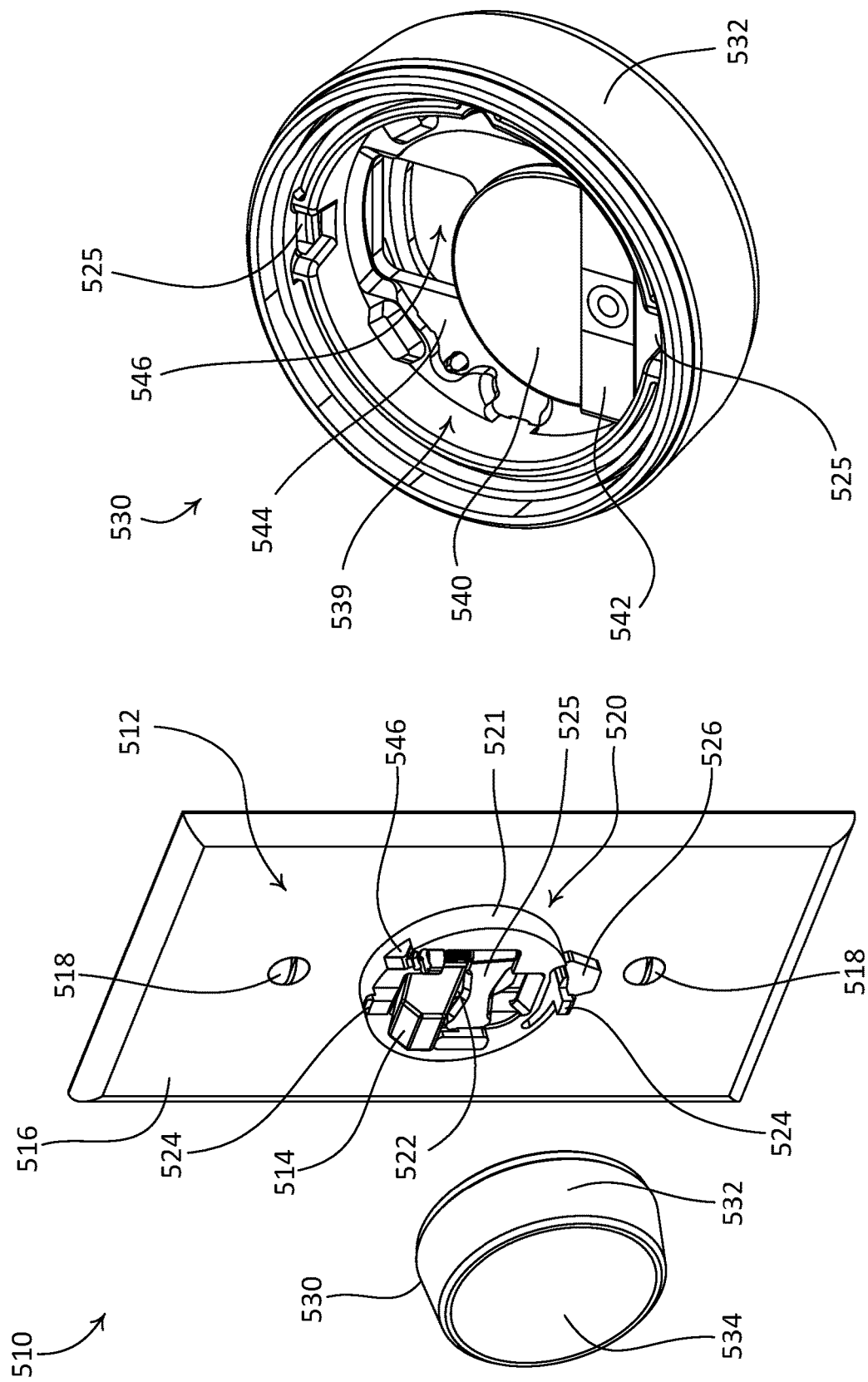

CONTROL DEVICE CONFIGURED TO PROVIDE VISUAL FEEDBACK

CROSS-REFERENCE TO RELATED APPLICATIONS

This application is a continuation U.S. patent application Ser. No. 17/073,014, filed on Oct. 16, 2020, which is a continuation of U.S. patent application Ser. No. 16/567,922, filed on Sep. 11, 2019, now U.S. Pat. No. 10,910,176, issued on Feb. 2, 2021, which claims priority from U.S. Provisional Patent Application No. 62/729,810, filed Sep. 11, 2018 and U.S. Provisional Patent Application No. 62/846,275, filed May 10, 2019, which are each hereby incorporated by reference herein in their entireties.

BACKGROUND

In accordance with certain installations of load control systems, one or more standard mechanical toggle switches may be replaced by more advanced load control devices (e.g., dimmer switches). Such load control devices may operate to control an amount of power delivered from an alternative current (AC) power source to an electrical load. The procedure of replacing a standard mechanical toggle switch with a load control device typically requires disconnecting electrical wiring, removing the mechanical toggle switch from an electrical wallbox, installing the load control device into the wallbox, and reconnecting the electrical wiring to the load control device. Often, such a procedure is performed by an electrical contractor or another skilled installer. Average consumers may not feel comfortable undertaking the electrical wiring that is necessary to complete installation of a load control device. Accordingly, there is a need for a load control system that may be installed into an existing electrical system that has a mechanical toggle switch, without requiring any electrical wiring work.

SUMMARY

A control device configured for use in a load control system to control an external electrical load, such as a lighting device, may provide feedback (e.g., simple feedback) regarding the operation of the control device. For example, the control device may comprise a base portion configured to be mounted to an electrical wallbox or over a mechanical switch, and a control unit configured to connect to the base portion. The control unit may comprise a rotation portion rotatable with respect to the base portion, an actuation portion having a front surface, a light source, and a control circuit. The control circuit may be configured to control the light source to illuminate at least an illuminated portion on the front surface of the actuation portion (e.g., near the top of the front surface of the actuation portion). In response to a rotation of the rotation portion, the control circuit may determine first control data for controlling the lighting device, control the light source to illuminate the illuminated portion of the actuation portion, and transmit control signals including the first control data. In response to an actuation of the actuation portion, the control circuit may determine second control data for controlling the lighting device, control the light source to illuminate the illuminated portion of the actuation portion, and transmit control signals including the second control data. The control unit may also comprise a mask that may be located between the light source and the actuation portion and may have an aperture through which light emitted by the light source may shine onto the actuation portion. In addition, the control unit may be configured to control the light source to emit light from a rear side of the control unit to illuminate at least a portion of a faceplate of the mechanical switch to which the base portion is mounted.

The control circuit may be configured to provide a limit indication when the lighting device is at or has reached a limit (e.g., a high-end trim or maximum intensity). The control circuit may provide the limit indication on the illuminated portion of the actuation portion in response to determining that the rotation portion has been continuously rotated by a predetermined threshold amount. For example, the predetermined threshold amount may be an amount of rotation required to raise the lighting device from a low-end intensity to a high-end intensity. In addition, the control circuit may keep track of an intensity of the lighting device and provide the limit indication on the illuminated portion of the actuation portion when the intensity of the lighting device has reached the limit. Further, the control unit may comprise a communication circuit configured to receive a message indicating that the lighting device has reached a limit, and the control circuit may provide the first indication on the illuminated portion of the actuation portion in response to receiving the message indicating that the lighting device has reached the limit.

The control circuit may also be configured to determine control data for adjusting a color temperature of the one or more lighting devices in response to the rotation of the rotation portion. The control circuit may illuminate the illuminated portion at a first color (e.g., a cool-white or blue color) when the rotation portion is rotated in a first direction (e.g., to raise the color temperature), and illuminate the illuminated portion at a second color (e.g., a warm-white or red color) when the rotation portion is rotated in a second direction (e.g., to lower the color temperature).

The control device may also be configured to provide advanced feedback on a visible indicator of the control unit. In response to a rotation of the rotation portion, the control circuit may determine control data for controlling an intensity of the lighting device, control the light sources to illuminate at least a portion of the visible indicator to indicate an intensity of the lighting device, and transmit control signals including the control data. The control circuit may be configured to control the plurality of light sources to provide the limit indication on the visible indicator when the intensity of the lighting device has reached a limit.

A control device configured for use in a load control system to control an external electrical load, such as a lighting device, may provide feedback regarding the operation of the control device. The control device may comprise a base portion configured to be mounted to an electrical wallbox or over a mechanical switch, and a control unit configured to connect to the base portion. The control device may comprise a control unit, which may be connected to the base portion. The control unit may comprise an actuation portion a light source and. The light source may be configured to emit light from the rear side of the control unit. For example, the light source may be configured to emit light from the rear side of the control unit and illuminate a portion of a faceplate of the mechanical switch (e.g., the mechanical switch to which the control unit is mounted on).

A portion of the faceplate of the mechanical switch may be illuminated to provide feedback in response to a user interface event. For example, the control unit may be configured to control the light source to illuminate an entire perimeter surrounding the control unit on the faceplate of the mechanical switch in response to an actuation of the actuation portion. Also, or alternatively, the control unit may be configured to control the light source to illuminate a segment of the perimeter surrounding the control unit in a certain color (e.g., red) to indicate a low-battery condition after detecting the actuation of the actuation portion.

BRIEF DESCRIPTION OF THE DRAWINGS

FIG. 7A is a front perspective view of an example remote control device that may be deployed as a remote control device of the load control systems illustrated in FIGS. 1A and 1B with a control unit detached from a base portion.

FIG. 7B is a rear perspective view of the control unit and the base portion of the remote control device depicted in FIG. 7A.

FIG. 8A is a front perspective view of an example remote control device that may be deployed as a remote control device of the load control system illustrated in FIG. 1 with a control unit detached from a base portion.

FIG. 8B is a rear perspective view of the control unit of the remote control device of FIG. 8A.

DETAILED DESCRIPTION

Figure 1A:
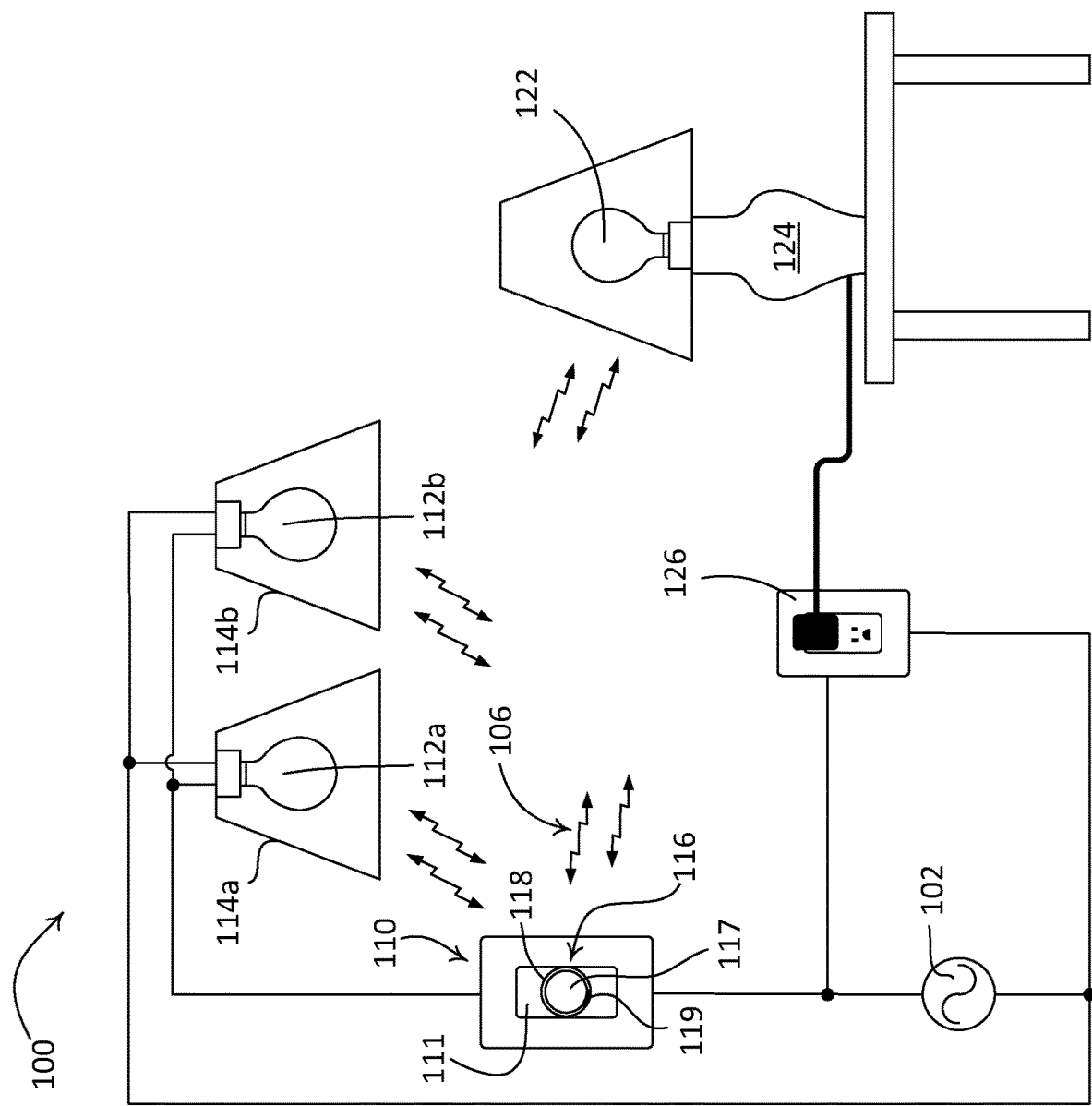
FIGS. 1A and 1B depict example load control systems that includes one or more example control devices.
Figure 1B:
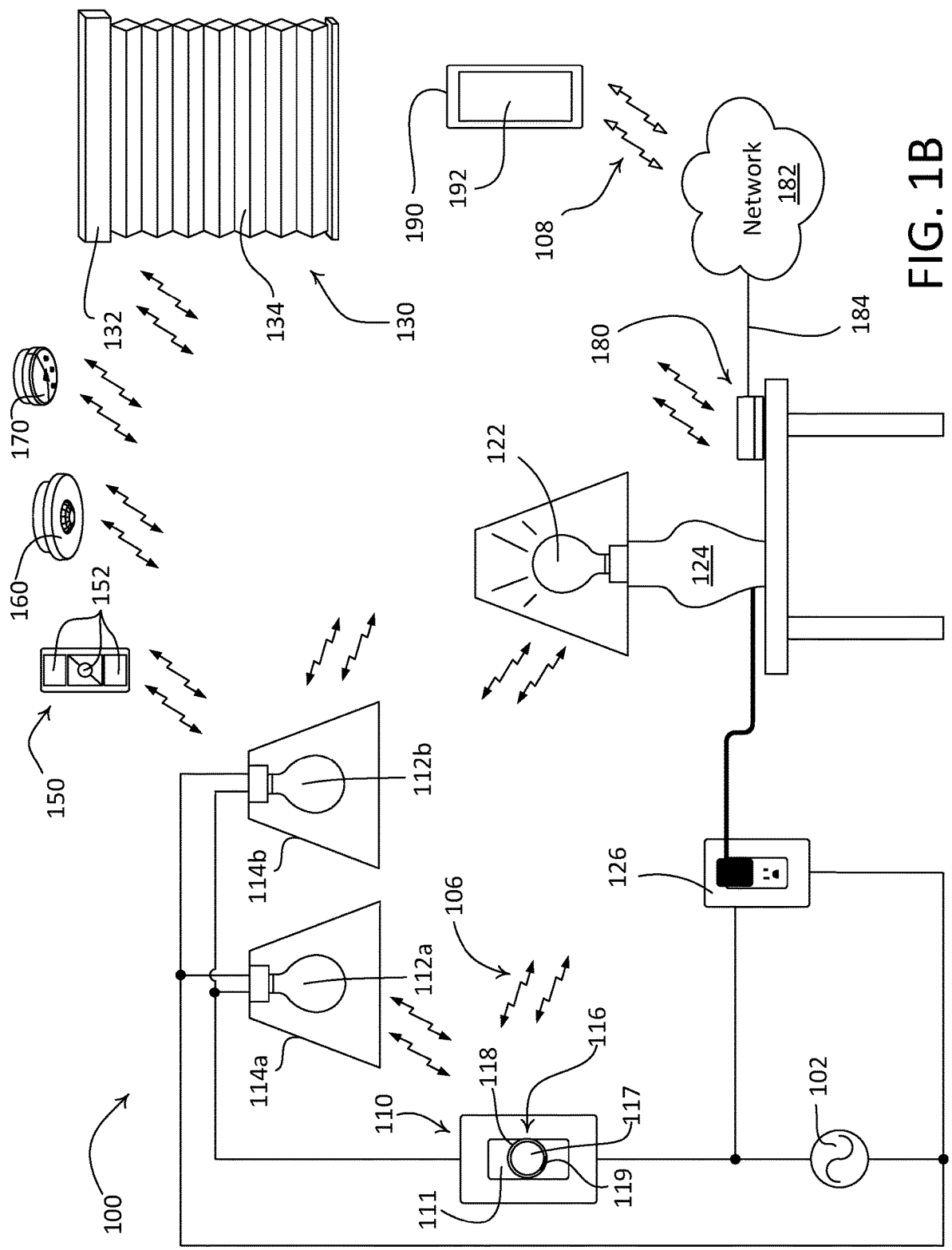

FIGS. 1A and 1B depict examples of a load control system 100 that may implement one or more message types for communicating messages (e.g., digital messages). As shown in FIG. 1A, the load control system 100 may include various control devices, such as controller devices and/or load control devices. A controller device may send digital messages to the load control device to cause the load control device to control the amount of power provided from an AC power source 102 to an electrical load in the load control system 100.

Load control devices may control the electrical loads within a room and/or a building. Each load control device may be capable of directly controlling the amount of power provided to an electrical load in response to communication from a controller device. Example load control devices may include lighting devices 112a, 112b and/or lighting device 122 (e.g., a load control device in light bulbs, ballasts, LED drivers, etc.). The lighting devices may be a lighting load itself, or a device that includes the lighting load and a lighting load controller.

A controller device may indirectly control the amount of power provided to an electrical load by transmitting digital messages to the load control device. The digital messages may include control data, such as control instructions (e.g., load control instructions), an indication of an actuation of a button or actuator, or another indication that causes the load control device to determine load control instructions for controlling an electrical load. Example controller devices may include a remote control device 116. The controller devices may include a wired or wireless devices.

Control devices (e.g., controller devices and/or load control devices) may communicate with other control devices and/or other devices via wired and/or wireless communications. The control devices may communicate using digital messages transmitted in a wireless signal. For example, the control devices may communicate via radio frequency (RF) signals 106. The RF signals 106 may be communicated via any suitable RF communications protocol (e.g., ZIGBEE®; Thread; near field communication (NFC); BLUETOOTH®; WI-FI®; a proprietary communication protocol, such as CLEAR CONNECT™, etc.). The digital messages may be transmitted as multicast messages and/or unicast messages via the RF signals 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

The lighting devices 112a, 112b may be controlled by a wall-mounted load control device 110. Though the lighting devices 112a, 112b are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112a, 112b. The wall-mounted load control device 110 may include a mechanical switch 111 (e.g., a previously-installed light switch) that may be opened and closed in response to actuations of a toggle actuator (not shown) for controlling the power delivered from the AC power source 102 to the lighting devices 112a, 112b (e.g., for turning on and off the lighting devices 112a, 112b). The lighting devices 112a, 112b may be installed in respective ceiling mounted downlight fixtures 114a, 114b or other lighting fixture mounted to another surface. The wall-mounted load control device 110 may be adapted to be wall-mounted in a standard electrical wallbox.

The remote control device 116 may be configured to transmit messages via the RF signals 106 for controlling the lighting devices 112a, 112b. The remote control device 116 may be a retrofit remote control device mounted over the toggle actuator of the mechanical switch 111. The remote control device 116 may be configured to maintain the toggle actuator of the mechanical switch 111 in the "on" position (e.g., by covering the switch when in the "on" position) to maintain the flow of power from the AC power source 102 to the lighting devices 112a, 112b. The remote control device 116 may comprise an actuation portion 117 that may be actuated (e.g., pushed in towards the mechanical switch 111) and a rotation portion 118 (e.g., a rotary knob) that may be rotated (e.g., with respect to the mechanical switch 111). Though a rotation portion 118 is disclosed, the remote control device 116 may include another type of intensity adjustment actuator, such as a linear slider, an elongated touch sensitive actuator, a rocker switch, separate raise/lower actuators, or another form of intensity adjustment actuator. The remote control device 116 may be battery-powered. In addition, the remote control device 116 may be mounted to another structure (e.g., other than the toggle actuator of the mechanical switch 111), such a as wall, may be attached to a pedestal to be located on a horizontal surface, or may be handheld. Further, the wall-mounted load control device 110 may comprise a wall-mounted remote control device that replaces the previously-installed mechanical switch 111 and may be configured to operate as the remote control device 116 to control the lighting devices 112a, 112b (e.g., by transmitting messages via the RF signals 106). Such a wall-mounted remote control device may derive power from the AC power source 102.

The lighting devices 112a, 112b may be turned on or off, or the intensity level may be adjusted, in response to the remote control device 116 (e.g., in response to actuations of the actuation portion 117 of the remote control device 116). For example, the lighting devices 112a, 112b may be toggled on or off by a toggle event identified at the remote control device 116. The toggle event may be a user event identified at the remote control device 116. The actuation portion 117 of the remote control device 116 may be actuated to toggle the lighting devices 112a, 112b on or off. The rotation portion 118 of the remote control device 116 may be rotated to adjust the intensities of the lighting devices 112a, 112b. The toggle event may be identified when the rotation portion 118 of the remote control device 116 is turned for a predefined angular distance and/or for a predefined amount of time, and/or the actuation portion 117 of the remote control device 116 is actuated. The intensity level of the lighting devices 112a, 112b may be increased or decreased by rotating the rotation portion 118 of the remote control device 116 in one direction or another, respectively. For example, the intensity level of each lighting device 112a, 112b may be adjusted between a high-end intensity (e.g., a maximum intensity, such as approximately 100%) and a low-end intensity (e.g., a minimum intensity, such as approximately 0.1%-10%). Though shown as comprising a rotary knob in FIGS. 1A and 1B, the remote control device 116 may comprise a paddle switch that may be actuated by a user, a linear control on which a user may swipe a finger, a raise/lower slider, a rocker switch, or another type of control capable of receiving user interface events as commands.

The remote control device 116 may provide feedback (e.g., visual feedback) to a user of the remote control device 116 on a visible indicator 119 (e.g., a status indicator). The visible indicator 119 may provide different types of feedback. The feedback may include feedback indicating actuations by a user or other user interface event, a status of electrical loads being controlled by the remote control device 116, and/or a status of the load control devices being controlled by the remote control device 116. The feedback may be displayed in response to user interface event and/or in response to messages received that indicate the status of load control devices and/or electrical loads. The visible indicator 119 may be illuminated by one or more light emitting diodes (LEDs) for providing feedback. For example, the visible indicator 119 may be a light bar included around the entire perimeter of the actuation portion 117 of the remote control device 116, or a portion thereof. The visible indicator 119 may also, or alternatively be a light bar in a line on the remote control device 116, such as when the remote control device is a paddle switch or a linear control, for example. In addition, the visible indicator 119 may be an illuminated portion on the actuation portion 117.

Example types of feedback may include illumination of the entire visible indicator 119 (e.g., to different levels), blinking or pulsing one or more LEDs in the visible indicator 119, changing the color (e.g., color temperature) of one or more LEDs on the visible indicator 119, and/or illuminating different sections of one or more LEDs in the visible indicator 119 to provide animation (e.g., clockwise and counter clockwise animation for raising and lowering a lighting level). The feedback on the visible indicator 119 may indicate a status of an electrical load or a load control device, such as a lighting intensity level for lights (e.g., lighting devices 112a, 112b, 122), a volume level for audio devices, a shade level for a motorized window treatment, and/or a speed for fans or other similar types of devices that operate at different speeds. The feedback on the visible indicator 119 may change based on the selection of different presets. For example, a different LED or LEDs may be illuminated on the visible indicator 119 to identify different presets (e.g., preset intensity levels for the lighting devices 112a, 112b, 122 and/or other preset configurations for load control devices).

The visible indicator 119, or a portion thereof, may be turned on or off to indicate the status of one or more of the lighting devices 112a, 112b, 122. For example, the visible indicator 119 may be turned off to indicate that the lighting devices 112a, 112b, 122 are in an off state. The entire visible indicator, or portion thereof, may be turned on to indicate that the lighting devices 112a, 112b, 122 are in the on state. The portion of the visible indicator 119 that is turned on may indicate the intensity level of one or more of the lighting devices 112a, 112b, 122. For example, when the lighting devices 112a, 112b, 122 are at a 50% intensity level, 50% of the visible indicator 119 may be turned on to reflect the intensity level of the lighting devices 112a, 112b, 122.

The remote control device 116 may provide simple feedback to the user on the visible indicator 119, for example, in response to actuations or other user interface event received at the remote control device 116. For example, simple feedback may indicate to a user that the remote control device 116 is operating correctly (e.g., in response to an actuation of the toggle button or a rotation). The simple feedback may illuminate or blink one or more LEDs in response to a button press. The simple feedback may indicate that the remote control device 116, or a button thereon, was actuated. The simple feedback may indicate that a command has been selected in response to user interface event. For example, the simple feedback may provide a blinking sequence in response to actuations of a toggle event. The simple feedback may provide a solid illumination of the visible indicator 119 at different lighting levels in response to clockwise and counterclockwise rotations of the remote control device 116 (e.g., as shown in FIGS. 11C-11D). As the simple feedback may provide information that does not indicate the status of a load control device, the visible indicator 119 may operate more as a visible indicator of other types of status or may not indicate a status of a device at all.

The remote control device 116 may provide advanced feedback to the user on the visible indicator 119 based on knowledge of the state of a load control device, such that the feedback may provide the state information to the user. For example, rotations of the remote control device 116 can cause the visual feedback to track the light level of the lighting devices 112a, 112b, 122. The light level may be stored in the remote control device 116 (e.g., if there is one remote control device assigned to lighting devices 112a, 112b, 122 and lighting devices 112a, 112b, 122 may be controlled as a group from the dedicated remote control device 116) or may be received by remote control device 116 in response to query messages transmitted from the remote control device 116. For advanced feedback in response to a user interface event, such as a toggle event, the lights on the visible indicator 119 may increase from off to an on light level when turning on the lighting devices 112a, 112b, 122, and decrease from the on light level to off when turning off the lighting devices 112a, 112b, 122. An example of a remote control device that provides simple and/or advanced feedback is described in greater detail in commonly-assigned U.S. Patent Application Publication No. 2018/0114434, published Apr. 26, 2018, entitled CONTROLLING GROUPS OF ELECTRICAL LOADS, the entire disclosure of which is hereby incorporated by reference.

The remote control device 116 may provide different feedback on the visible indicator 119 based on the number of load control devices associated with the remote control device 116. For example, the remote control device 116 may provide different feedback on the visible indicator 119 when a single lighting device 112a is associated with the remote control device 116 than when multiple lighting devices 112a, 112b, 122 are associated with the remote control device 116. When a single load control device is associated with the remote control device 116, the remote control device 116 may provide advanced feedback on the visible indicator 119. When multiple load control devices are associated with the remote control device 116, the remote control device 116 may provide simple feedback on the visible indicator 119. Simple feedback may be provided when the remote control device 116 is associated with multiple load control devices, as the load control devices may be different types of devices may be currently controlled differently, may be at different levels (e.g., different intensity levels), and/or may be at levels that are unknown to the remote control device 116.

The remote control device 116 may provide different feedback on the visible indicator based on whether the loads of the associated load control devices are in sync. When the loads are in sync (e.g., the same status is received for the associated load control devices), the remote control device 116 may provide advanced feedback on the visible indicator 119. For example, in response to a toggle event or a rotation (e.g., for a predefined angular distance and/or for a predefined amount of time in a direction) for controlling an intensity level of the lighting devices 112a, 112b, 122, the remote control device 116 may awaken from a sleep state and query the lighting devices 112a, 112b, 122 for their current state. The remote control device 116 may receive the current state (e.g., on/off state, lighting level, color, etc.) of the lighting devices 112a, 112b, 122 and determine that the lighting devices 112a, 112b, 122 are in the same state. The visible indicator 119 on the remote control device 116 may indicate the status of the lighting devices 112a, 112b, 122 that is received in response to the query message. While the remote control device 116 remains awake, the visible indicator 119 may reflect the updated status of one or more of the lighting devices 112a, 112b, 122 as the status changes. After a predefined period of time, the remote control device 116 may return to the sleep state. The visible indicator 119 may be turned off in the sleep state to conserve battery power.

When the loads are out of sync (e.g., a different status is received for the associated load control devices), the remote control device 116 may provide simple feedback or advanced feedback on the visible indicator 119. For example, in response to a toggle event or a rotation (e.g., for a predefined angular distance and/or for a predefined amount of time in a direction) for controlling an intensity level of the lighting devices 112a, 112b, 122, the remote control device 116 may awaken from a sleep state and query the lighting devices 112a, 112b, 122 for their current state. The visible indicator 119 on the remote control device 116 may indicate the status of one or more of the lighting devices 112a, 112b, 122 that is received in response to the query message. When the status of the lighting devices 112a, 112b, 122 are in sync, the remote control device 116 may provide advanced feedback such that the visible indicator 119 on the remote control device 116 indicate the intensity level at which all of the lighting devices 112a, 112b, 122 are operating.

When the status of the lighting devices 112a, 112b, 122 are out of sync, the remote control device 116 may provide simple feedback on the visible indicator 119. For example, the visible indicator 119 on the remote control device 116 may reflect the current state of the lighting device 112a, 112b, 122 that is the first to respond to the query message, or the state of a particular lighting device 112a, 112b, 122 in the group. For example, in response to the query message for the current state of the lighting devices 112a, 112b, 122, the lighting device 112a may respond first that it is at a 10% intensity level. The visible indicator 119 on the remote control device 116 may reflect the current state of the lighting device 112a on the visible indicator 119. The group of lighting devices 112a, 112b, 122 may be the lighting devices that have been associated in memory with the remote control device 116, or otherwise stored in memory with a group identifier for being controlled together.

When the status of the lighting devices 112a, 112b, 122 are out of sync, the visible indicator 119 may provide advanced feedback that represents the status of the group of lighting devices 112a, 112b, 122. For example, visible indicator 119 may indicate the average intensity of the group of lighting devices 112a, 112b, 122 or the state of the majority of the lighting devices 112a, 112b, 122. The visible indicator 119 may provide advanced feedback to indicate the state of the group of lighting devices 112a, 112b, 122 by lighting the entire visible indicator 119 when a majority of the lighting devices 112a, 112b, 122 are in the on state, turning the visible indicator 119 off when the majority of the lighting devices 112a, 112b, 122 are in the off state, lighting a portion of the visible indicator 119 that identifies an average lighting level of the group of lighting devices 112a, 112b, 122, increasing an intensity of the visible indicator 119 to a percentage that reflects the intensity of the lighting devices 112a, 112b, 122, etc.

When the status of the lighting devices 112a, 112b, 122 are out of sync, the visible indicator 119 may provide simple or advanced feedback that indicates that the lighting devices 112a, 112b, 122 are out of sync. For example, the remote control device 116 may provide simple feedback by making the entire visible indicator 119 lit, unlit, or flash to indicate that the lighting devices 112a, 112b, 122 are out of sync. The remote control device 116 may provide advanced feedback by blinking or pulsing the visible indicator 119 while displaying the average intensity level of the lighting devices 112a, 112b, 122, by periodically transitioning the visible indicator 119 between the intensity levels of the lighting devices 112a, 112b, 122, or by periodically transitioning the visible indicator 119 between maximum and minimum intensity levels of the lighting devices 112a, 112b, 122. When the group of lighting devices 112a, 112b, 122 are out of sync, no feedback may be provided, a constant feedback indication may be provided, or feedback may be provided (e.g., flashing LEDs) that indicates that the group of lighting devices are out of sync.

The remote control device 116 may be configured to display feedback (e.g., simple feedback) in response to determining that one or more of the lighting devices 112a, 112b, 122 are "missing." For example, the remote control device may be configured to blink the entire visible indicator 119 (e.g., in a particular color, such as red) and/or provide an animation to indicate that one or more of the lighting devices 112a, 112b, 122 are missing. The remote control device 116 may be configured to determine that one of the lighting devices 112a, 112b, 122 is missing, for example, in response to not receiving a response to a query message transmitted to that particular lighting device. For example, one of the lighting devices 112a, 112b, 122 may be "missing" if that lighting device has been removed from its fixture or lamp (e.g., unscrewed), is unplugged, is faulty, the corresponding light switch is turned off (e.g., light switch in a series is turned off, while others are on), and/or has reached end of life.

The remote control device 116 may provide advanced feedback if the load control devices (e.g., lighting devices 112a, 112b, 122) with which the remote control device 116 is associated are not associated with other remote control devices. The remote control device 116 may provide simple feedback if one or more of the load control devices (e.g., lighting devices 112a, 112b, 122) with which the remote control device 116 is associated are also associated with other remote control devices. This may allow for more granular feedback of a group of individual load control devices with which the remote control device 116 is associated, while preventing continuous updating or confusion when other remote control devices are controlling the multiple load control devices (e.g., lighting devices 112a, 112b, 122).

The remote control device 116 may transmit digital messages via the RF signals 106 to control the lighting devices 112a, 112b, 122. The remote control device 116 may be configured to adjust the intensities of the lighting devices 112a, 112b, 122 using absolute control in order to control the intensities of the lighting devices 112a, 112b, 122 to an absolute level (e.g., a specific level). For example, the remote control device 116 may transmit digital messages including a move-to-level command (e.g., a go-to-level or go-to command) that identifies a lighting level to which the lighting devices may change. The move-to-level command may include the amount of time over which the lighting level may be changed at the lighting devices. The move-to-level command may indicate an "on" event or an "off" event to turn the lighting devices 112a, 112b, 122 on or off, respectively. For example, the "on" event may be indicated with a 100% lighting level, or another preset lighting level. The "off" event may be indicated with a 0% intensity level. The lighting level for the "on" event and/or the "off" event may also, or alternatively, be stored at the lighting devices 112a, 112b, 122 and the lighting devices may change to the lighting level upon receiving an indication of the occurrence of the "on" event or "off" event at the remote control device 116. The digital messages may indicate an "on" event when the remote control device 116 is rotated a for predefined angular distance and/or for a predefined amount of time in one direction. As an example, the remote control device 116 may transmit digital messages when the remote control device 116 is rotated for 100 milliseconds (ms). The digital messages may indicate an "off" event when the remote control device 116 is rotated for a predefined angular distance and/or for a predefined amount of time in the opposite direction. The digital messages may indicate an "on" event or an "off" event when the remote control device 116 is pressed (e.g., when a button on the face of the remote control device is pressed or the remote control device 116 is pressed in). The "on" event or "off" event may be indicated in a digital message with a toggle command that indicates for the lighting devices 112a, 112b, 122 to toggle from "on" to "off," or vice versa.

In response to a user interface event (e.g., actuation, rotation, finger swipe, etc.) or a proximity sensing event (e.g., a sensing circuit sensing an occupant near the remote control device 116) at the remote control device 116, the remote control device 116 may determine a starting point (e.g., a dynamic starting point) from which the lighting level of one or more of the lighting devices 112a, 112b, 122 may be controlled. Each rotation of the rotation portion 118 may cause the remote control device 116 to determine the dynamic starting point from which control may be performed. In response to the user interface event and/or a proximity sensing event (e.g., a sensing circuit sensing an occupant near the remote control device 116), the remote control device 116 may query the lighting devices 112a, 112b, 122 for a current status (e.g., after awakening from sleep mode). The current status of one or more of the lighting devices 112a, 112b, 122 may be used to set the dynamic starting point from which the remote control device 116 may perform control. For example, the remote control device 116 may set the dynamic starting point of the rotation portion 118 to the current intensity level (e.g., on, off, 10%, 20%, etc.) of the first of the lighting devices 112a, 112b, 122 to respond to the query, or a predefined lighting device 112a, 112b, 122.

In another example, the remote control device 116 may set the dynamic starting point of the rotation portion 118 based on the intensity level of multiple lighting devices 112a, 112b, 122. The remote control device 116 may set the dynamic starting point of the rotation portion 118 to an average intensity level (e.g., on, off, 10%, 20%, etc.) of the lighting devices 112a, 112b, 122, or a common lighting intensity (e.g., on, off, 10%, 20%, etc.) of a majority of the lighting devices 112a, 112b, 122, for example. The remote control device 116 may set the dynamic starting point of the rotation portion 118 to a maximum level of the lighting devices 112a, 112b, 122 when the rotation portion 118 is being rotated clockwise to raise the intensity level of the lighting devices, or a minimum level of the lighting devices 112a, 112b, 122 when the rotation portion 118 is being rotated counterclockwise to lower the intensity level of the lighting devices, for example. The visible indicator 119 may be illuminated as feedback to reflect the dynamic starting point to the user. For example, the remote control device 116 may illuminate a portion of the visible indicator 119 that reflects the lighting intensity that is set as the dynamic starting point.

The remote control device 116 may calculate an increase or decrease in intensity level from the dynamic starting point based on the user interface event. For example, the remote control device 116 may calculate an increase or decrease in intensity level based on the distance or amount of time the rotation portion 118 is turned. The rotation from the point of the initial interaction by the user with the rotation portion 118 may be used to identify the increase or decrease in intensity level from the dynamic starting point. When the remote control device 116 includes a linear control, the remote control device 116 may calculate an increase or decrease in intensity level based on the distance or amount of time the user swipes a finger up or down on the linear control. The user's finger swipe from the point of the initial interaction by the user with the linear control may be used to identify the increase or decrease in intensity level from the dynamic starting point.

The updated intensity level may be calculated from the user's initial interaction and stored at the remote control device 116. The updated intensity level may be included in a move-to-level command that is transmitted from the remote control device 116 to the lighting devices 112a, 112b, 122, for example, when the remote control device 116 is using absolute control.

The visual feedback displayed by the visible indicator 119 may be provided in or derived from the information in the move-to-level command when the remote control device 116 is using absolute control. For example, the remote control device 116 may reflect the intensity level transmitted in the move-to-level command in the visible indicator 119.

The remote control device 116 may transmit digital messages configured to increase the lighting level of the lighting devices 112a, 112b, 122 when the rotation portion 118 is rotated in a direction (e.g., clockwise). As previously mentioned, the remote control device 116 may be configured to adjust the intensities of the lighting devices 112a, 112b, 122 to an absolute level using absolute control. In addition, or alternatively, the remote control device 116 may be configured to adjust the intensities of the lighting devices 112a, 112b, 122 using relative control to adjust the intensities of the light devices 112a, 112b, 122 by a relative amount. For example, the remote control device 116 may transmit digital messages configured to decrease the lighting level of the lighting devices 112a, 112b, 122 when the remote control device 116 is rotated in the opposite direction (e.g., counterclockwise). The digital messages may include a move-with-rate command, which may cause the lighting devices 112a, 112b, 122 to change their respective intensity level by a predefined amount. The move-with-rate command may include the amount of time over which the lighting level may be changed at the lighting devices. The move-with-rate command may cause the lighting devices 112a, 112b, 122 to retain their relative or proportional intensity levels, and/or difference in respective intensity levels. The remote control device 116 may send digital messages to increase or decrease the lighting level by a predefined amount when rotated for a predefined angular distance and/or for a predefined amount of time. The amount of the increase or decrease may be indicated in the digital messages or may be predefined at the lighting devices 112a, 112b, 122.

The visible indicator 119 may be controlled differently when the remote control device 116 is operating using relative control and when the remote control device 116 is operating using absolute control. The remote control device 116 may provide advanced feedback on the visible indicator 119 when performing absolute control, as each of the load control devices (e.g., lighting devices 112a, 112b, 122) may be in sync. The remote control device 116 may provide a simple feedback when performing relative control, as each of the load control devices (e.g., lighting devices 112a, 112b, 122) may be out of sync. When using relative control, the visible indicator 119 may not be illuminated to provide feedback of the intensity of the lighting devices 112a, 112b, 122. The visible indicator 119 may be illuminated to different intensities when the remote control device 116 is raising and lowering the intensity level of the lighting devices 112a, 112b, 122. For example, the visible indicator 119 may be illuminated to a first intensity (e.g., 66%) when raising the intensity level of the lighting devices 112a, 112b, 122 and a second intensity (e.g., 33%) when lowering the intensity level of the lighting devices 112a, 112b, 122. Alternatively, or additionally, the visible indicator 119 may be illuminated to match the maximum intensity or the minimum intensity of the group of lighting devices 112a, 112b, 122.

The mode of control (e.g., relative control or absolute control) may be dynamically updated at the remote control device 116. For example, the remote control device 116 may change the mode of control depending upon the number of the lighting devices 112a, 112b 122 that are associated with the remote control device 116. The remote control device 116 may use the absolute control when associated with a single lighting device. The remote control device 116 may use the relative control when associated with multiple lighting devices. The mode of control may also, or alternatively, be updated based on whether the lighting devices 112a, 112b 122 are in sync or out of sync. The remote control device 116 may use the absolute control when the lighting devices 112a, 112b 122 are in sync. The remote control device 116 use the relative control when the lighting devices 112a, 112b 122 are out of sync.

The visual feedback provided by the visible indicator 119 may be dynamically updated depending on the mode of control being used at the remote control device 116. The remote control device 116 may provide feedback according to the simple feedback mode when using relative control and according to the advanced feedback mode when using absolute control. For example, the advanced feedback mode may provide feedback that indicates an intensity level of one or more lighting devices as a portion of the entire visible indicator 119. The simple feedback mode may provide simple feedback that illuminates the entire visible indicator 119 to different levels when raising or lowering intensity.

The digital messages transmitted via the RF signals 106 may be multicast messages. For example, the digital messages including the move-to-level command may be transmitted as multicast messages. The multicast messages may include a group identifier for controlling the lighting devices 112a, 112b, 122 that are a part of a multicast group. The lighting devices 112a, 112b, 122 may be a part of the multicast group when they are associated with the group identifier (e.g., by having the group identifier stored thereon) for recognizing multicast messages transmitted to the group. The lighting devices 112a, 112b, 122 that are associated with the group identifier may recognize the multicast messages and control the corresponding lighting loads according to the command in the multicast messages. The lighting devices 112a, 112b, 122 may forward the multicast messages with the group identifier for identification and load control by other lighting devices associated with the group identifier.

The group may be formed at commissioning or configuration of the load control system 100. The remote control device 116 may generate the group identifier and send the group identifier to the lighting devices 112a, 112b, 122 and/or a hub device when the remote control device 116 is in an association mode (e.g., entered upon selection of one or more buttons). The devices that store the group identifier may be part of the group of devices that are associated with the remote control device 116 and can respond to group messages.

The remote control device 116 may transmit the digital messages as multicast messages and/or unicast messages via the RF signal 106. For example, the digital messages including the move-with-rate command or the move-to-level command may be transmitted as unicast messages. Unicast messages may be sent from the remote control device 116 directly or via hops to each of the lighting devices 112a, 112b, 122. The remote control device 116 may individually send a unicast message to each of the lighting devices 112a, 112b, 122 with which the remote control device 116 is associated for performing load control. The remote control device 116 may have the unique identifier of each of the lighting devices 112a, 112b, 122 with which it is associated stored in memory. The remote control device 116 may generate a separate unicast message for each lighting device 112a, 112b, 122 and address the unicast messages to the lighting devices 112a, 112b, 122 independently. The unicast messages may also include the unique identifier of the remote control device 116. The lighting devices 112a, 112b, 122 may identify the unicast messages communicated to them by identifying their own unique identifier and/or a corresponding identifier of the remote that are stored in an association dataset. The lighting devices 112a, 112b, 122 may operate according to the instructions (e.g., load control instructions) in the digital messages comprising their own unique identifier and/or the unique identifier of an associated device, such as the remote control device 116.

The remote control device 116 may transmit digital messages that include move-with-rate commands (e.g., as unicast messages and/or multicast messages) to increase or decrease the lighting intensity level of the lighting devices 112a, 112b, 122 in predefined increments as the user turns the remote control device 116 for a predefined angular distance and/or for a predefined amount of time in one direction or another. The remote control device 116 may continue to transmit digital messages to the lighting devices 112a, 112b, 122 as the user continues to turn the remote control device 116. For example, the remote control device 116 may identify a rotation of a predefined distance or for a predefined time and send one or more digital messages to instruct the lighting devices 112a, 112b, 122 to each increase by ten percent (10%). The remote control device 116 may identify a continued rotation of for a predefined angular distance and/or for a predefined amount of time and send digital messages to instruct the lighting devices 112a, 112b, 122 to increase by ten percent (10%) again.

The remote control device 116 may also, or alternatively, send digital messages for a move-to-level command (e.g., "on" command, "off" command, toggle command, etc.) to turn on/off the lighting devices 112a, 112b, 122. The remote control device 116 may transmit one or more digital messages to the lighting devices 112a, 112b, 122 when an on event or an off event are detected. For example, the remote control device 116 may identify a rotation or actuation and send digital messages to instruct the lighting devices 112a, 112b, 122 to turn on/off. The remote control device 116 may operate by sending a move-with-rate command after turning on. For example, the remote control device 116 may identify a rotation for a predefined angular distance and/or for a predefined amount of time after turning on and send digital messages to instruct the lighting devices 112a, 112b, 122 to increase/decrease by a predefined intensity (e.g., ten percent (10%)).

Embodiments described herein are not limited to remote control devices. Other controller devices may also be used in the same, or similar, manner. For example, embodiments may include wired control devices and/or plug-in control devices that communicate digital messages as described herein.

FIG. 1B shows an example load control system 100 having other devices. For example, the load control system 100 may include other control devices, such as controller devices and/or load control devices. The load control devices may be capable of controlling the amount of power provided to a respective electrical load based on digital messages received from the controller devices, which may be input devices. The digital messages may include load control instructions or another indication that causes the load control device to determine load control instructions for controlling an electrical load.

Examples of load control devices may include a motorized window treatment 130 and/or the lighting devices 112a, 112b, 122, though other load control devices may be implemented. The controller devices may include a remote control device 150, an occupancy sensor 160, a daylight sensor 170, and/or a network device 190, though other controller devices may be implemented. The controller devices may perform communications in a configuration similar to the remote control device 116 as described herein. The load control devices may perform communications in a configuration similar to the lighting devices 112a, 112b, 122 as described herein.

The load control devices may receive digital messages via wireless signals, e.g., radio-frequency (RF) signals 106 (e.g., ZIGBEE®; NFC; BLUETOOTH®; WI-FI®; Thread; or a proprietary communication channel, such as CLEAR CONNECT™, etc.). The wireless signals may be transmitted by the controller devices. In response to the received digital messages, the respective lighting devices 112a, 112b, 122 may be turned on and off, and/or the intensities of the respective lighting devices 112a, 112b, 122 may be increased or decreased. In response to the received digital messages, the motorized window treatment 130 may increase or decrease a level of a covering material 134.

The battery-powered remote control device 150 may include one or more actuators 152 (e.g., one or more of an on button, an off button, a raise button, a lower button, or a preset button). The battery-powered remote control device 150 may transmit RF signals 106 in response to actuations of one or more of the actuators 152. The battery-powered remote control device 150 may be handheld. The battery-powered remote control device 150 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The remote control device 150 may be a wireless device capable of controlling a load control device via wireless communications. The remote control device 150 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL WITH LABEL SERVING AS ANTENNA ELEMENT; and U.S. Pat. No. 9,679,696, issued Jun. 13, 2017, entitled WIRELESS LOAD CONTROL DEVICE, the entire disclosures of which are hereby incorporated by reference.

The occupancy sensor 160 may be configured to detect occupancy and/or vacancy conditions in the space in which the load control system 100 is installed. The occupancy sensor 160 may transmit digital messages to load control devices via the RF communication signals 106 in response to detecting the occupancy or vacancy conditions. The occupancy sensor 160 may operate as a vacancy sensor, such that digital messages are transmitted in response to detecting a vacancy condition (e.g., digital messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 170 may be configured to measure a total light intensity in the space in which the load control system 100 is installed. The daylight sensor 170 may transmit digital messages including the measured light intensity via the RF communication signals 106 for controlling load control devices in response to the measured light intensity. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade systems, or other suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit 132 of the motorized window treatment 130. The motor drive unit 132 may respond to digital messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference Digital messages transmitted by the controller devices may include a command and/or identifying information, such as a serial number (e.g., a unique identifier) associated with the transmitting controller device. Each of the controller devices may be associated with the lighting devices 112*a*, 112*b*, 122 and/or the motorized window treatment 130 during a configuration procedure of the load control system 100, such that the lighting devices 112*a*, 112*b*, 122 and/or the motorized window treatment 130 may be responsive to digital messages transmitted by the controller devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 100 may include a hub device 180 (e.g., a system bridge and/or a system controller) configured to enable communication with a network 182, e.g., a wireless or wired local area network (LAN). The hub device 180 may be connected to a router via a wired digital communication link 184 (e.g., an Ethernet communication link). The router may allow for communication with the network 182, e.g., for access to the Internet. The hub device 180 may be wirelessly connected to the network 182, e.g., using wireless technology, such as WI-FI® technology, cellular technology, etc. The hub device 180 may be configured to transmit communication signals (e.g., RF signals 106) to the lighting devices 112*a*, 112*b*, 122 and/or the motorized window treatment 130 for controlling the devices in response to digital messages received from external devices via the network 182. The hub device 180 may communicate via one or more types of RF communication signals. The hub device 180 may be configured to transmit and/or receive RF signals 106 (e.g., using ZIGBEE®; NFC; BLUETOOTH®; or a proprietary communication channel, such as CLEAR CONNECT™, etc.). The hub device 180 may be configured to transmit digital messages via the network 182 for providing data (e.g., status information) to external devices.

The RF signals 106 may be transmitted via one or more protocols. For example, the remote control device 116 and the remote control device 150 may communicate digital messages to lighting devices 112*a*, 112*b*, 122 via another protocol (e.g., ZIGBEE®, BLUETOOTH®, etc.) than other devices. For example, the occupancy sensor 160, daylight sensor 170, and/or motorized window treatment 130 may communicate via a proprietary communication channel, such as CLEAR CONNECT™. The hub device 180 may format digital communications using the appropriate protocol for the device. The hub device 180 may communicate using multiple protocols.

The hub device 180 may operate as a central controller for the load control system 100, and/or relay digital messages between the control devices (e.g., lighting devices, motorized window treatments, etc.) of the load control system and the network 182. The hub device 180 may receive digital messages from a controller device and configure the digital message for communication to a load control device. For example, the hub device 180 may configure multicast messages and/or unicast messages for transmission as described herein. The hub device 180 may be on-site at the load control system 100 or at a remote location. Though the hub device 180 is shown as a single device, the load control system 100 may include multiple hubs and/or the functionality thereof may be distributed across multiple devices.

The load control system 100 may include a network device 190, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® handheld computing device), a WI-FI® or wireless-communication-capable television, or any other suitable network communication or Internet-Protocol-enabled device. The network device 190 may be operable to transmit digital messages in one or more Internet Protocol packets to the hub device 180 via RF signals 108, either directly or via the network 182. For example, the network device 190 may transmit the RF signals 108 to the hub device 180 via a WI-FI® communication link, a WIMAX® communications link, a BLUETOOTH® communications link, a near field communication (NFC) link, a cellular communications link, a television white space (TVWS) communication link, or any combination thereof. The RF signals 108 may be communicated using a different protocol and/or wireless band than the RF signals 106. For example, the RF signals 108 may be configured for WI-FI® communication or cellular communication, while RF signals 106 may be configured for ZIGBEE®, BLUETOOTH®, Thread, or a proprietary communication channel, such as CLEAR CONNECT™. In another example, the RF signals 108 and the RF signals 106 may be the same. Examples of load control systems operable to communicate with network devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit digital messages to the load control devices and/or the hub device 180 through the wireless communications described herein.

The operation of the load control system 100 may be programmed and configured using the hub device 180 and/or network device 190. An example of a configuration procedure for a wireless load control system is described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The remote control device 116 may receive an indication when the hub device 180 and/or other control devices are implemented in the load control system 100. The remote control device 116 may be associated with other controller devices (e.g., remote control device 150, occupancy sensor 160, daylight sensor 170, network device 190, etc.), or may be otherwise notified when the controller devices are associated with another device (e.g., a lighting device 112a, 112b, 122 or the hub device 180) in the load control system 100. The remote control device 116 may be associated with the hub device 180, or may be otherwise notified (e.g., via a message from the hub device 180, a notification of association from a lighting device 112a, 112b, 122 that associated with the hub device 180, etc.) when the hub device 180 is implemented into the system 100.

The remote control device 116 may operate to provide different types of feedback (e.g., advanced feedback or simple feedback) based on information about the associated devices. For example, the remote control device 116 may provide different feedback on the visible indicator 119 when associated with a master device, such as the hub device 180 or other master device, than when not associated with the master device. The remote control device 116 may provide advanced feedback on the visible indicator 119 when associated with the hub device 180 that is capable of providing the status of load control devices to the remote control device 116. The remote control device 116 may provide simple feedback on the visible indicator 119 when not associated with the hub device 180.

The remote control device 116 may provide feedback via the visible indicator 119 in different feedback modes based on whether the remote control device 116 is associated with the hub device 180 or another master device, such as one of the lighting devices 112a, 112b, 122, for example. The remote control device 116 may provide advanced feedback when associated with a master device and provide simple feedback when not associated with a master device. When the remote control device 116 is associated with a master lighting device, the remote control device 116 may provide advanced feedback on the visible indicator 119 and display the state of the master lighting device as feedback on the visible indicator 119. As the master device may synchronize the state of the lighting devices 112a, 112b, 122, the remote control device 116 may provide advanced feedback that indicates an intensity level of the synchronized group of lighting devices 112a, 112b, 122. In addition, the master device may collect and store the intensity levels of the group of lighting devices 112a, 112b, 122, and may decide the level to display for advanced feedback if the lighting devices are out of sync. When the remote control device 116 is not associated with a master device, the remote control device 116 may provide simple feedback that illuminates the entire visible indicator 119 to different levels when raising or lowering intensity of lighting devices 112a, 112b, 122, or when the lighting devices 112a, 112b, 122 are on or off.

Though the remote control device 116 may be operating in the load control system 100 with other controller devices, the other controller devices may not be associated with the group of lighting devices 112a, 112b, 122 that are associated with the remote control device 116. As the other controller devices may not be associated with the group of lighting devices 112a, 112b, 122, the other controller devices may be unable to toggle the on/off state of the lighting devices 112a, 112b, 122. The remote control device 116 may determine whether other controller devices are associated with the lighting devices 112a, 112b, 122 by querying the lighting devices 112a, 112b, 122 for associated devices. Each lighting device 112a, 112b, 122 may respond with the unique identifiers of devices associated with the device. The unique identifiers may indicate devices or device types (e.g., remote control devices, occupancy sensors, daylight sensors, network devices, hub devices, etc.) associated with the lighting devices 112a, 112b, 122.

Figure 2:
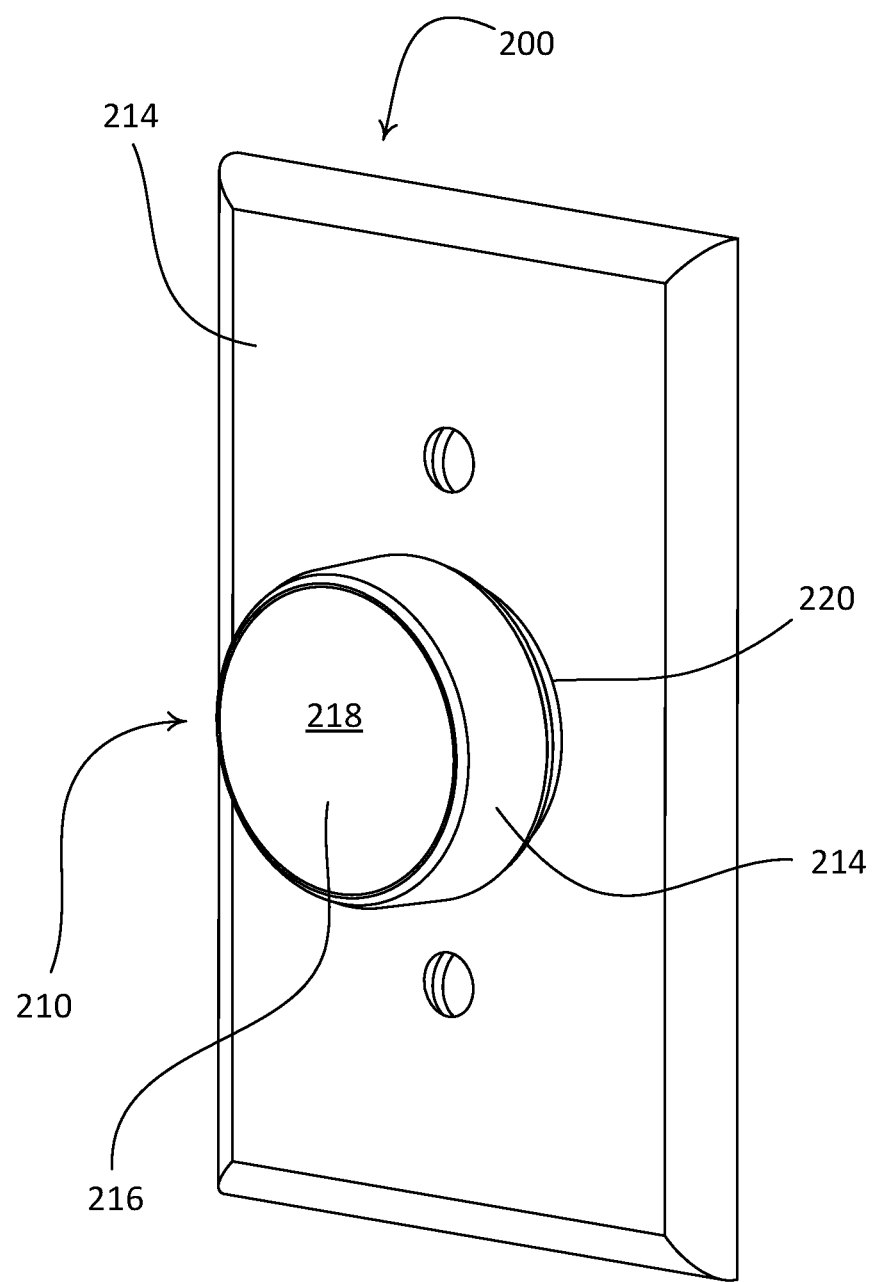
FIG. 2 is a perspective view of an example control device that may be deployed as a dimmer switch and/or a remote control device of the load control systems illustrated in FIGS. 1A and 1B.

FIG. 2 depicts an example control device 200 that may be deployed as the remote control device 116 in the load control system 100. The lighting control system 100 may include one or more electrical loads, such as the lighting loads 102, 104. The control device 200 may comprise a user interface 210 (e.g., a user input device) and a faceplate 212. The user interface 202 may include a rotation portion 214 that is rotatable with respect to the faceplate 212 for controlling one or more characteristics of the lighting loads controlled by the control device (e.g., adjusting the intensities and/or the colors of the lighting loads). The user interface 210 may also include an actuation portion 216 having a front surface 218 that may be pressed in towards the faceplate 212 for turning the lighting loads on and off (e.g., toggling the lighting loads). The control device 200 may comprise a base portion 220 for rotatably supporting the rotation portion 214. The actuation portion 216 may be received in a central opening (e.g., a circular opening) defined by the rotation portion 214. When the actuation portion 216 is actuated, the actuation portion 216 may move through the central opening of the rotation portion 214 (e.g., move towards the faceplate 212 along an axis perpendicular to the faceplate) to actuate an internal switch (not shown). The actuation portion 216 may return (e.g., move away from the faceplate 212 along the axis perpendicular to the faceplate) to an idle position (e.g., as shown in FIG. 2) after being actuated.

The control device 200 may be configured to transmit one or more wireless communication signals (e.g., the RF signals 106 of FIGS. 1A and 1B) to a lighting device (e.g., the lighting devices 112a, 112b, 122 of the load control system 100). The control device 200 may include a wireless communication circuit (e.g., an RF transceiver or transmitter (not shown)) via which one or more wireless communication signals may be sent and/or received. The control device 200 may be configured to transmit digital messages (e.g., including commands to control a lighting device) via the wireless communication signals.

For example, when the actuation portion 216 is actuated (e.g., pressed in towards the faceplate 212), the control device 200 may be configured to transmit one or more wireless communication signals including control data for turning the lighting device on and off (e.g., toggling the lighting device). The control device 200 may be configured to transmit a command to toggle the lighting device (e.g., from off to on or vice versa) in response to an actuation of the actuation portion 216. In addition, the control device 200 may be configured to transmit a command to turn the lighting device on in response to an actuation of the actuation portion 216 (e.g., if the control device 200 possesses information indicating that the lighting device is presently off). The control device 200 may be configured to transmit a command to turn the lighting device off in response to an actuation of the actuation portion 216 (e.g., if the control unit possesses information indicating that the lighting device is presently on). The control device 200 may be configured to transmit a command to turn the lighting device on to a maximum power level (e.g., to turn the lighting device on to full intensity) in response to a double tap of the actuation portion 216 (e.g., two actuations in quick succession).

When the rotation portion 214 is rotated while the actuation portion 216 is in the idle position (e.g., the front surface 218 of the actuation portion 216 is in a first plane), the control device 200 may be configured to transmit one or more wireless communication signals including control data to raise the intensity of the lighting device in response to a clockwise rotation of the rotation portion 214 and to transmit a command to lower the intensity of the lighting device in response to a counterclockwise rotation of the rotation portion 214. In addition, when the rotation portion 214 is rotated while the actuation portion 216 is being pressed in towards the faceplate 212 (e.g., the front surface 218 of the actuation portion 216 is in a second plane), the control device 200 may be configured to transmit one or more wireless communication signals including control data to adjust a color (e.g., a color temperature) of the lighting device in response to clockwise and counterclockwise rotations of the rotation portion 214.

When the lighting device is on, the control device 200 may be configured to decrease the power level of the lighting device to a low-end intensity (e.g., a minimum intensity) in response to a counter-clockwise rotation of the rotation portion 214 and may only turn off the lighting device in response to an actuation of the actuation portion 216. The control device 200 may also be configured in a spin-to-off mode, in which the control device 200 may turn off the lighting device after the power level of the lighting device (e.g., intensity of the lighting device) is controlled to a minimum level in response to a counter-clockwise rotation of the rotation portion 214 (e.g., without an actuation of the actuation portion). When the lighting device is off and the rotation portion 214 is rotated clockwise, the control device 200 may be configured to adjust the intensity of the lighting device to a level determined from how much the rotation portion 214 is rotated (e.g., the angular distance that the rotation portion is rotated). When the lighting device is off and the rotation portion 214 is rotated counter-clockwise, the control device 200 may be configured to adjust the intensity of the lighting device to the low-end intensity (e.g., independent of how much the rotation portion 214 is rotated).

The front surface 218 of the actuation portion 216 may be configured to be illuminated to provide feedback to a user of the control device 200. For example, the front surface 218 of the actuation portion 216 may be illuminated by one or more light sources, such as light-emitting diodes (LEDs) located inside of the control device 200. When each of the actuation portion 216 and/or the rotation portion 214 are in idle positions, the front surface 218 of the actuation portion 216 may not be illuminated. The front surface 218 of the actuation portion 216 may be illuminated to provide simple feedback, for example, when the actuation portion 216 has been actuated and/or the rotation portion 214 has being rotated. The front surface 218 of the actuation portion 216 may be illuminated to provide simple feedback to indicate that the control device 200 has detected a rotation of the rotation portion 214 and/or an actuation of the actuation portion 216 and is responding to the actuation, for example, by transmitting wireless signals to a lighting device. An example of a control device that may provide simple and advanced feedback is described in greater detail in commonly-assigned U.S. Patent Application Publication No. 2018/0116040, published Apr. 26, 2018, entitled CON- TROLLING GROUPS OF ELECTRICAL LOADS, the entire disclosure of which is hereby incorporated by reference.

In certain load control systems, a respective control device may be positioned such that the lighting devices paired with the remote control device are not visible to a user interfacing with the control device. As a result, the user may be unable to perceive or appreciate the changes caused by the user interface events at the control device, which may cause the user to inefficiently interact with the control device. For example, the user may rotate the rotation portion in a clockwise direction (e.g., to raise the intensity of the lighting device) even when the lighting devices are at a maximum intensity (e.g., 100% intensity). Similarly, the user may rotate the rotation portion in a counter-clockwise direction (e.g., to lower the intensity of the lighting device) even when the lighting devices are at a minimum intensity (e.g., 0% intensity). In order to provide the user with an indication of the present and/or future intensity of the lighting device, the control device may be configured to provide feedback (e.g., simple feedback and/or advanced feedback) to the user in response to a user interface event.

Figure 3A:
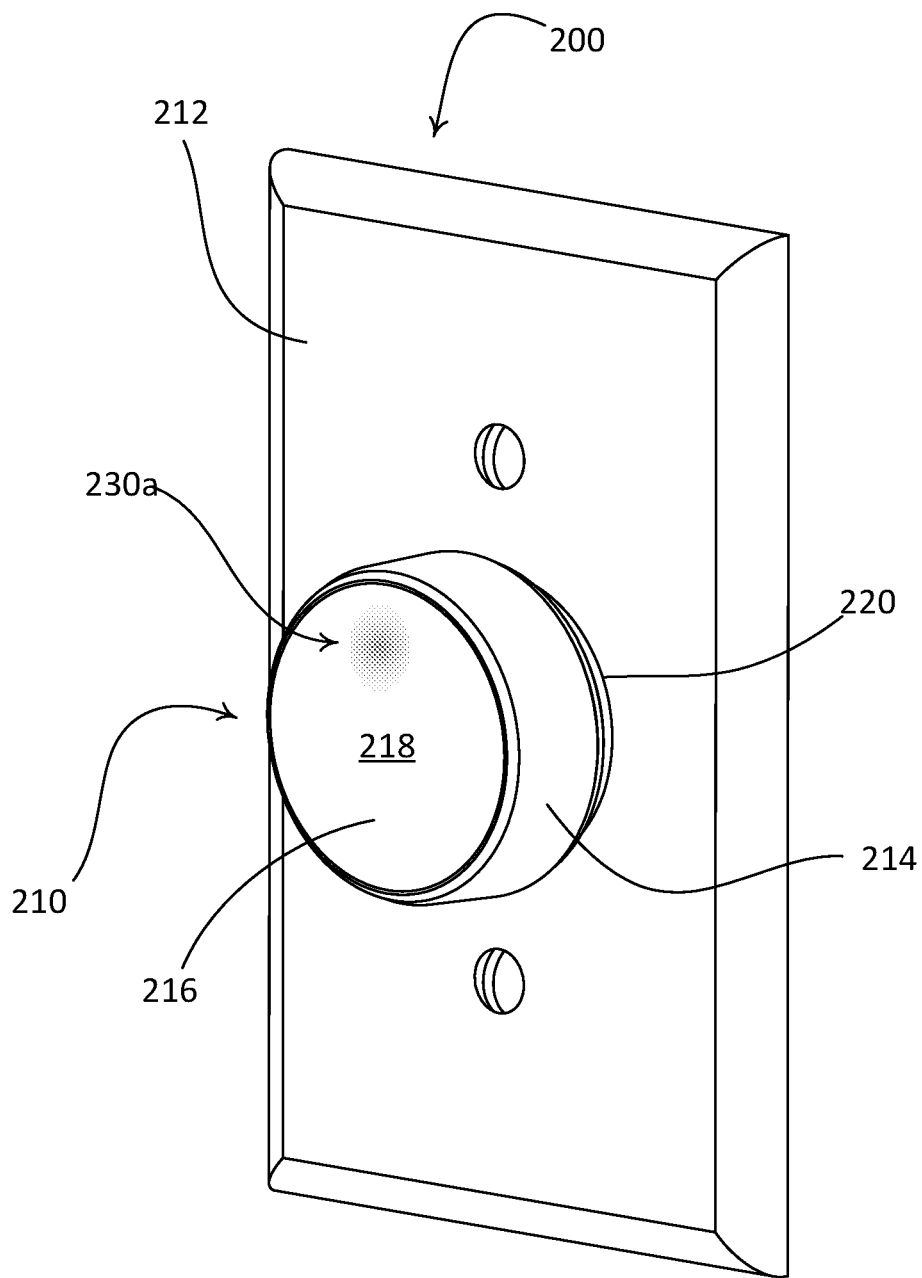
FIGS. 3A-3D illustrate different forms of simple feedback that may be provided by the control device of FIG. 2.
Figure 3B:
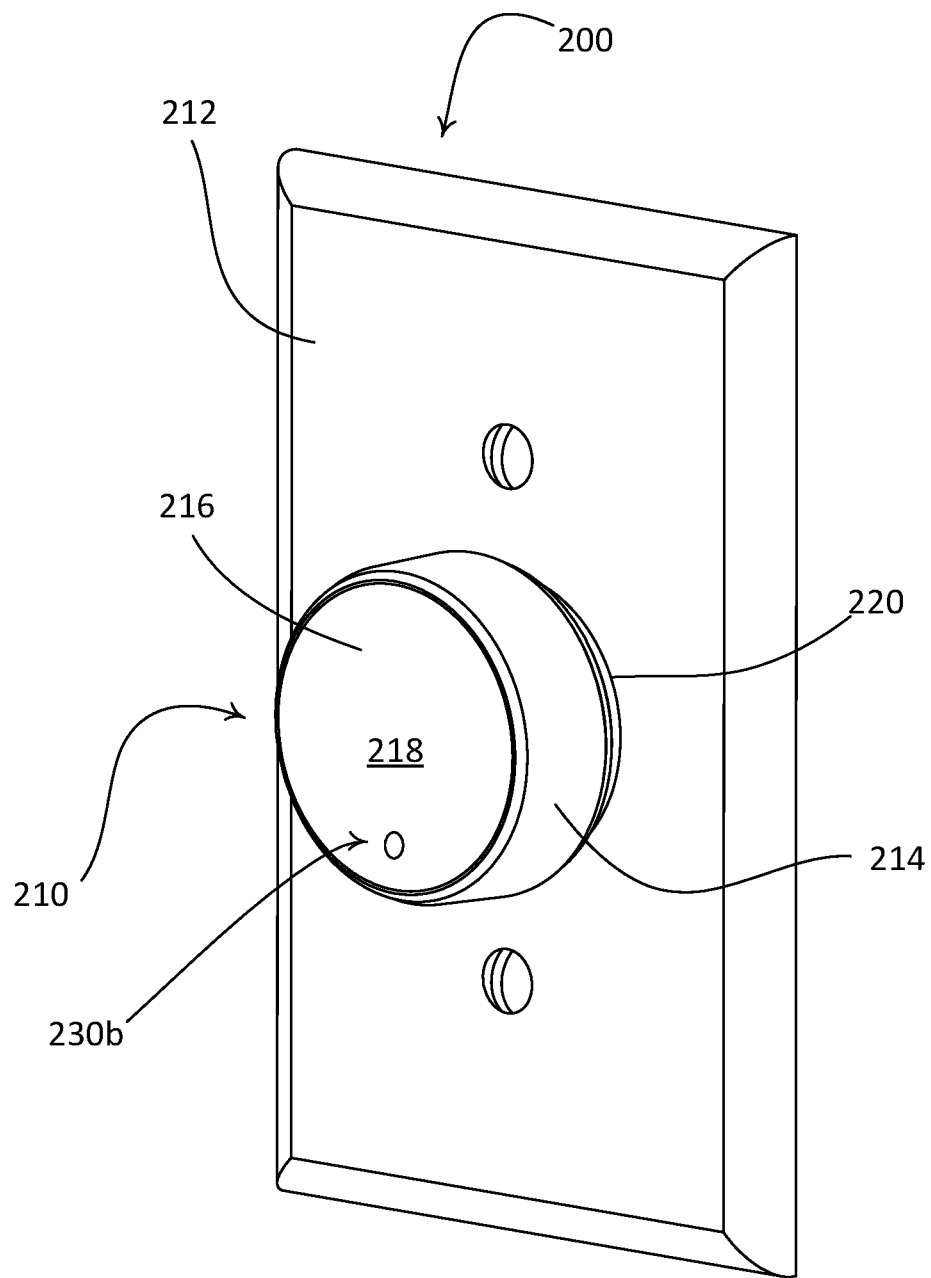
Figure 3C:
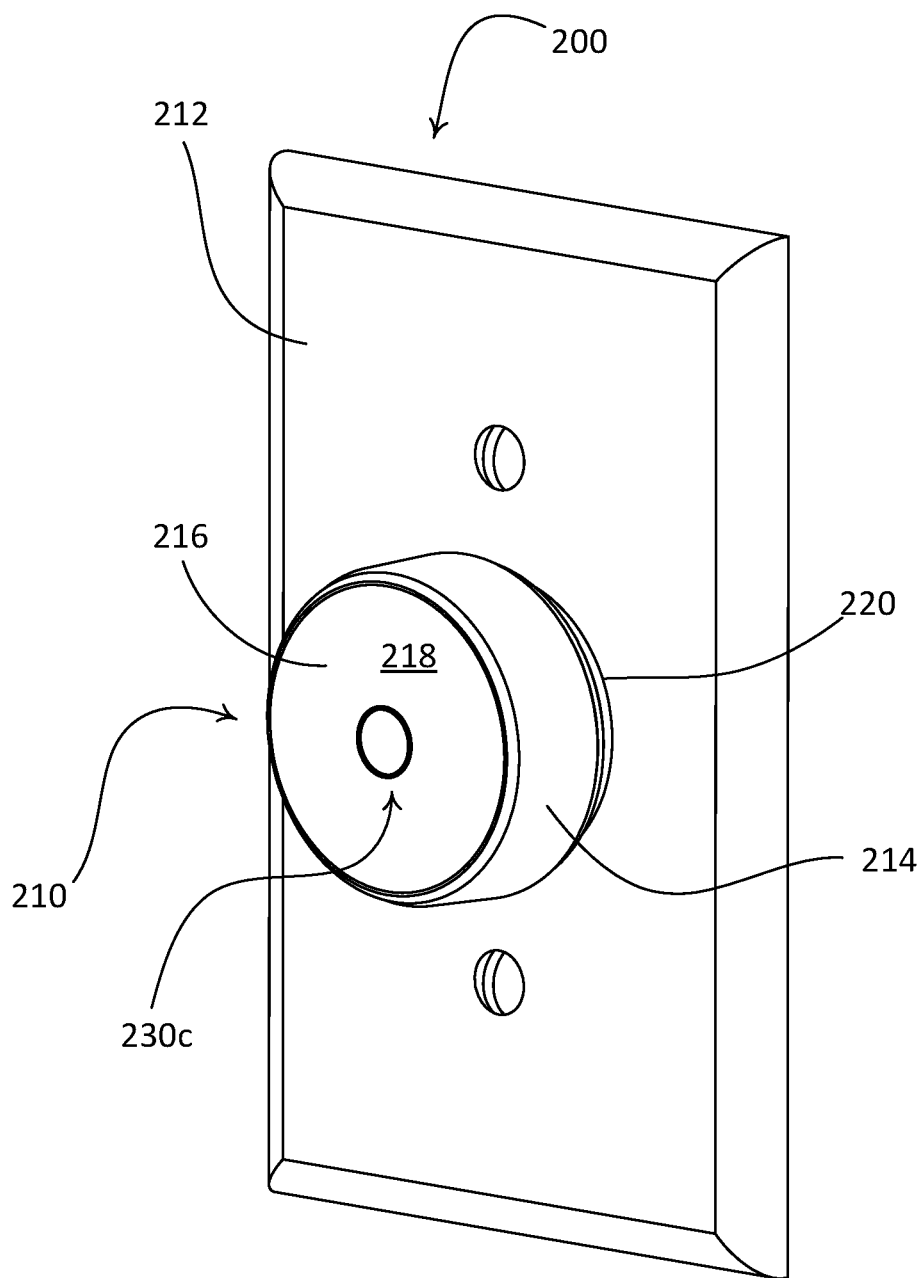

FIGS. 3A-3D illustrate the control device 200 providing different forms of feedback (e.g., simple feedback). As shown in FIGS. 3A-3C, the control device 200 may be configured to provide a visible indicator by energizing a light source (e.g., an LED) inside of the control device 200 to light up an illuminated portion (e.g., respective illuminated portions 230a-230c shown in FIGS. 3A-3C) of the front surface 218 of the actuation portion 216. With respect to FIGS. 3A-3D, the visual indicator may be used to provide feedback of the present and/or future intensity of the lighting devices paired with the control device 200. For example, the illuminated portion 230a of the front surface 218 shown in FIG. 3A may be located near the top of the actuation portion 216. The illuminated portion 230a of the front surface 218 may be illuminated with a diffuse (e.g., fuzzy) circle of light as shown in FIG. 3A. For example, the illuminated portion 230a may be illuminated with a diffuse circle of light in response to an actuation of the actuation portion 216. In addition, the illuminated portion 230b of the front surface 218 shown in FIG. 3B may be located near the bottom of the actuation portion 216. The illuminated portion 230b of the front surface 218 may be illuminated with a sharp circle of light as shown in FIG. 3B. Further, the illuminated portion 230c of the front surface 218 shown in FIG. 3C may be located near the center of the actuation portion 216 and may be a ring of light (e.g., not a filled-in circle).

Figure 3D:
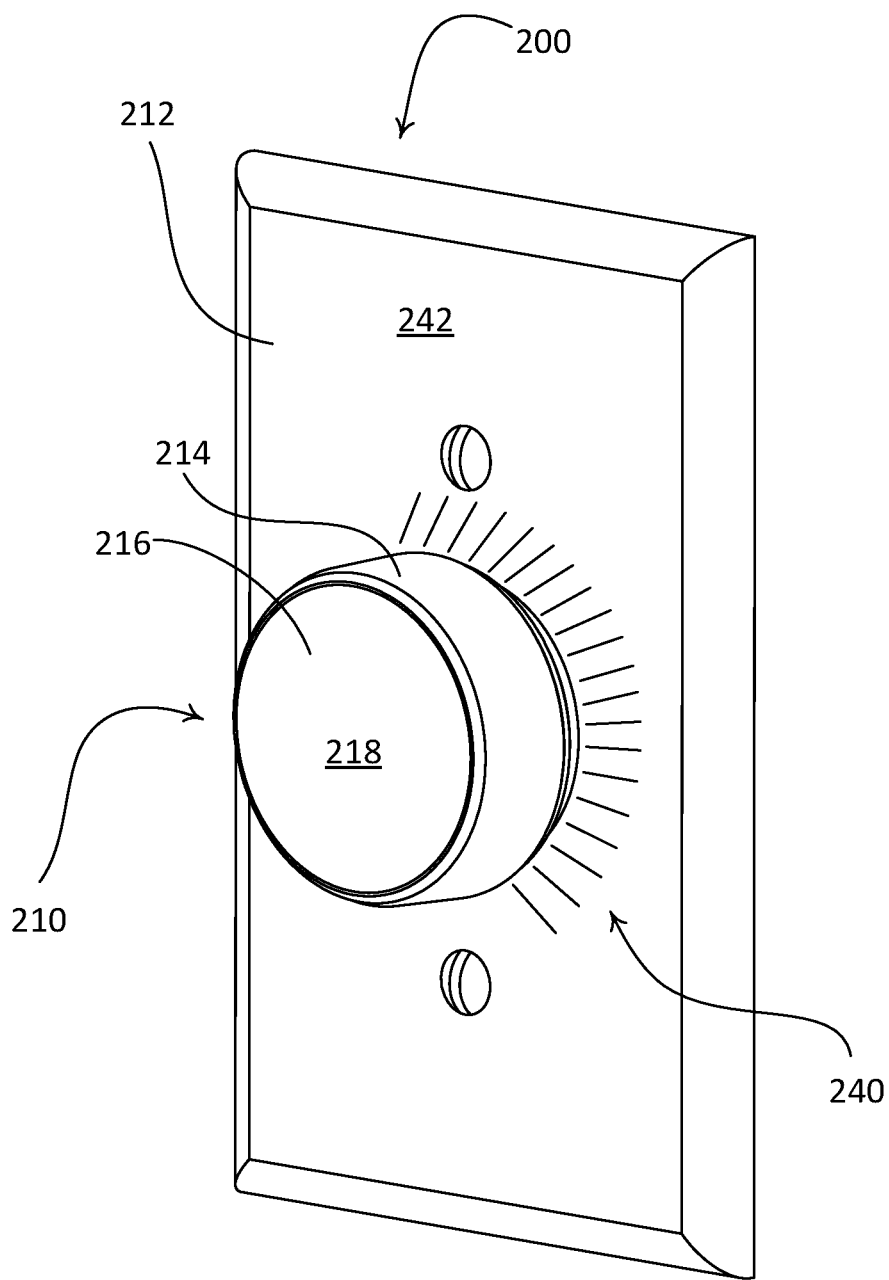
Figure 3E:
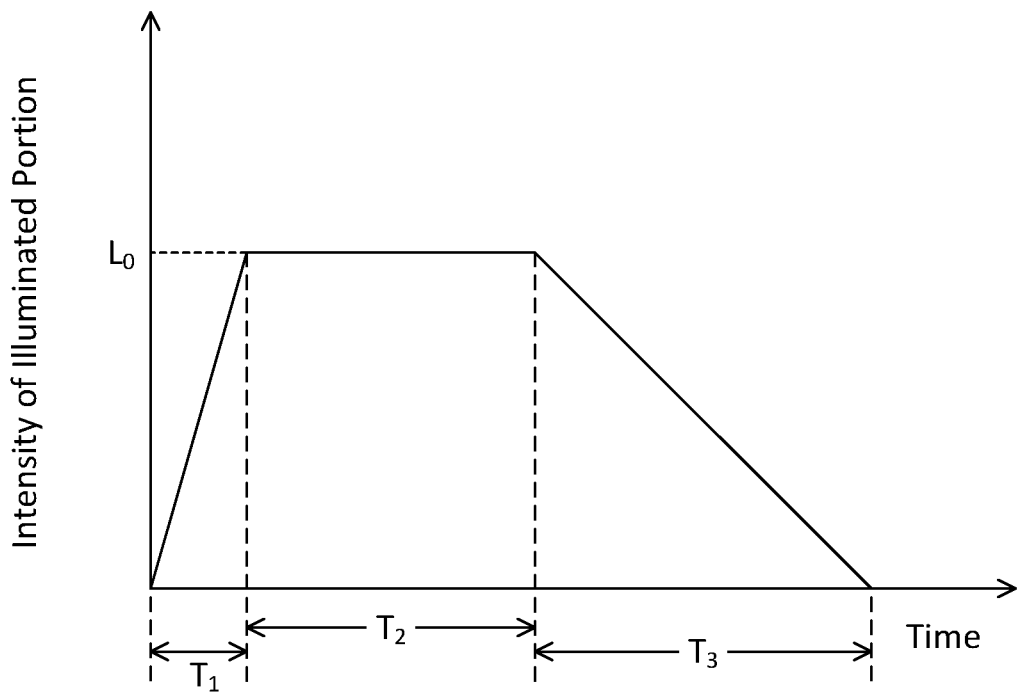
FIG. 3E shows an example plot of the intensity of an illuminated portion of the control device of FIG. 2 with respect to time in response to an actuation of an actuator.

The illuminated portion 230a-230c of the front surface 218 may be illuminated for a period of time (e.g., a fixed period of time) after an actuation of the rotation portion 214 and/or the actuation portion 216 is first detected and then not illuminated after the period of time expires. For example, the illuminated portion 230a-230c of the front surface 218 may be illuminated continuously (e.g., at a single intensity) during the period of time. FIG. 3E shows an example plot of the intensity of the illuminated portion 230a-230c with respect to time after an actuation of the rotation portion 214 and/or the actuation portion 216. For example, the illuminated portion 230a-230c may be quickly faded onto a predetermined intensity $L_0$ at a first rate, maintained at the predetermined intensity $L_0$, and then faded off to zero at a second rate that is slower than the first rate. A period of time $T_1$ over which the fade up occurs may be shorter than a period of time $T_3$ over which the fade down occurs. The intensity of the illuminated portion 230a-230c may be maintained at the predetermined intensity $L_0$ for a period of time $T_1$, which may be, for example, a fixed period of time. In addition, the illuminated portion 230a-230c of the front surface 218 may remain illuminated (e.g., be illuminated continuously) while the rotation portion 214 and/or the actuation portion 216 are being actuated and then not illuminated after the actuation has ended. For example, the fade up may be displayed upon the beginning of the actuation of the rotation portion 214 and/or the actuation portion 216, and/or the fade down may be displayed upon release of the rotation portion and/or actuation portion. The period of time $T_1$ over which the fade up occurs and the period of time $T_3$ over which the fade down occurs may be fixed periods of time, while the period of time $T_1$ (e.g., during which the intensity of the illuminated portion 230a-230c may be maintained at the predetermined intensity $L_0$) may be variable dependent upon how long the actuation of the rotation portion 214 and/or the actuation portion 216 occurs.

Figure 3F:
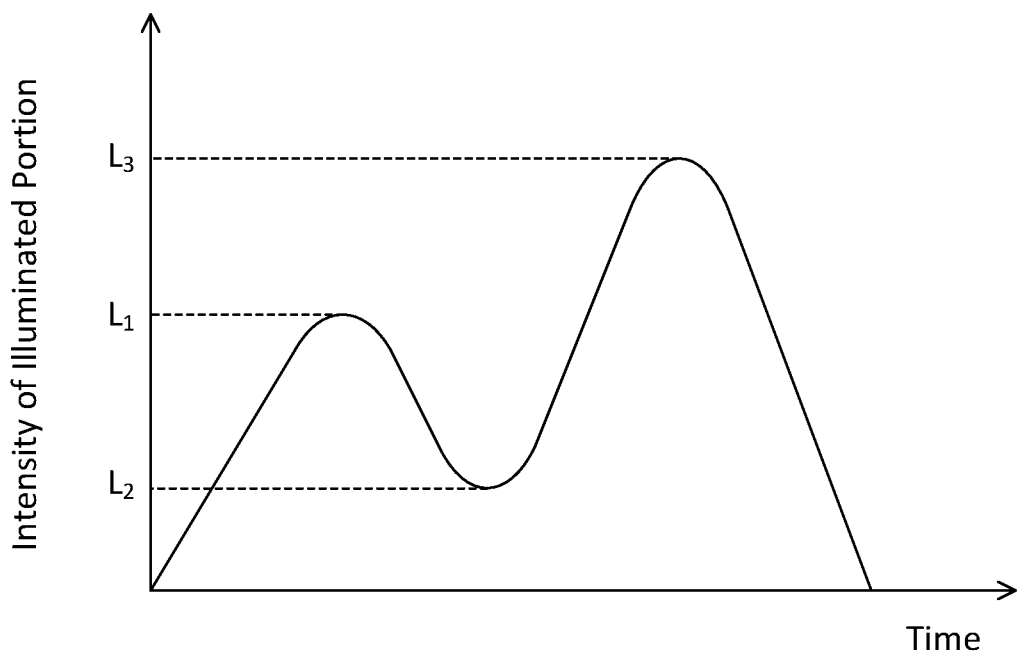
FIG. 3F shows an example plot of the intensity of an illuminated portion of the control device of FIG. 2 with respect to time in order to generate a "heartbeat" animation.

The illuminated portion 230a-230c of the front surface 218 may be illuminated with an animation (e.g., a predetermined illumination pattern over a period of time). For example, the animation may be a "heartbeat" animation. FIG. 3F shows an example plot of the intensity of the illuminated portion 230a-230c with respect to time in order to generate the animation. For example, the intensity of the illuminated portion 230a-230c may be quickly increased to a first intensity $L_1$, quickly decreased to a second intensity $L_2$, quickly increased to a third intensity $L_3$, and then quickly turned off.

The illuminated portion 230a-230c may be illuminated with different types of illumination in response to different rotations of the rotation portion 214 and/or actuations of the actuation portion 216. For example, the illuminated portion 230a-230c may be blinked if the actuation portion 216 is being actuated to the turn the lighting load on or off, and may be strobed if the actuation portion 216 is being actuated to configure the control device (e.g., to associate the control device with the lighting load). In addition, the illuminated portion 230a-230c may be illuminated with different types of illumination depending upon which of the rotation portion 214 and the actuation portion 216 is presently being actuated or rotated.

The illuminated portion 230a-230c may be illuminated with different types of illumination when the rotation portion 214 is rotated to adjust the color temperature of the lighting device (e.g., while the actuation portion 216 is being pressed in towards the faceplate 212 and the front surface 218 of the actuation portion 216 is in the second plane). For example, the illuminated portion 230a-230b may be illuminated a first color (e.g., a blue color or a cool-white color) when the rotation portion 214 is being rotated clockwise to increase the color temperature towards a cool-white color temperature $T_{CW}$ (e.g., a cool-white color temperature limit) and illuminated a second color (e.g., a red color or a warm-white color) when the rotation portion 214 is being rotated counter-clockwise to decrease the color temperature towards a warm-white color temperature $T_{WW}$ (e.g., a warm-white color temperature limit). In addition, the color of the illuminated portion 230a-230b may be adjusted as the rotation portion 214 is rotated to adjust the color temperature of the lighting device. Further, the illuminated portion 230a-230c may be illuminated different colors when the rotation portion 214 is rotated to control the lighting device to a color (e.g., any color) in the red-green-blue (RGB) color space. For example, the control device 200 may adjust the color of the illuminated portion 230a-230c when the rotation portion 214 is rotated while the actuation portion 216 is being pressed in towards the faceplate 212, and transmit the final color that is selected when the actuation portion 216 is released.

The illuminated portion 230a-230c may be illuminated to indicate that the lighting device has reached a limit, such as the high-end intensity. For example, when the lighting device has reached the high-end intensity, the control device 200 may be configured to provide a limit indication (e.g., a limit animation, such as a high-end animation), such as blinking or fluttering the illuminated portion 230a-230c (e.g., turning on and off rapidly numerous times over a period of time). The control device 200 may be configured to receive, for example, a message including an indication that the lighting device is at the high-end intensity. The control device 200 may be configured to keep track of and/or estimate the intensity of the lighting device when the control device fails to receive feedback of the intensity level of the lighting device. In addition, the control device 200 may be configured to keep track of and/or estimate the intensity of the lighting device in response to the rotation of the rotation portion 214 and provide the limit indication when the tracked intensity of the lighting device reaches the high-end intensity. Further, the control device 200 may be configured to provide the indication that the lighting device has reached the high-end intensity when the rotation portion 214 has been rotated (e.g., continuously rotated) by a predetermined threshold amount (e.g., approximately 210°), for example, without receiving any wireless communication signals indicating that the lighting device is at the high-end intensity. For example, rotation of the rotation portion 214 by the predetermined threshold amount may result in a change of the intensity level of the lighting device from the low-end intensity to the high-end intensity. The control device 200 may also indicate that the lighting device has reached another limit, such as the low-end intensity and/or color temperatures limits of the lighting device.

The illuminated portion 230a-230c may be illuminated in different manners and/or with different colors to indicate different conditions, rotations of the rotation portion 214, and/or actuations of the actuation portion 216. For example, in response to an actuation of the actuation portion 216, the illuminated portion 230a-230c may be illuminated white (or blue) if a battery of the control device 200 has an appropriate amount of energy, and may be illuminated red to indicate a low-battery condition (e.g., to indicate that the battery does not have an appropriate amount of energy). In addition, a different portion than the illumination portion 230a-230c of the actuation portion 216 may be illuminated to indicate the low-battery condition. For example, when the illuminated portion 230a is illuminated at the top of the actuation portion 216 in response to an actuation of the rotation portion 214 and/or the actuation portion 216, an indication may be provided on the bottom of the actuation portion 216 to indicate the low-battery condition. Control devices that provide indications of low-battery conditions are described in greater detail in commonly-assigned U.S. Patent Application Publication No. 2017/0354012, published Dec. 7, 2017, entitled USER INTERFACE FOR A CONTROL DEVICE, the entire disclosure of which is hereby incorporated by reference.

In addition, the control device 200 may provide simple feedback by shining light out of a rear side of the control device 200. For example, light may shine out of the back of the control device 200 to provide an illuminated area 240 on a front surface 242 of the faceplate 212 surrounding at least a portion or the entire perimeter of the rotation portion 214 of the control device as shown in FIG. 3D. The light may shine out of a gap between the control device 200 and the base portion 220. In addition, the base portion 220 may be at least partially transparent or translucent in order to shine light emitted from the rear side of the control device out between the control device 200 and the faceplate 212.

The light shining on the illuminated area 240 may be controlled as described above for the illuminated portion 230a-230c of the front surface 218 of the actuation portion 216 as shown in FIGS. 3A-3C (e.g., may be continuously illuminated, blinked or strobed for a period of time, as an animation, etc.). The illuminated area 240 may be illuminated with different types of illumination in response to different actuations of the rotation portion 214 and/or the actuation portion 216, and/or depending upon which of the rotation portion 214 and the actuation portion 216 is presently being actuated. Further, the illuminated area 240 may be illuminated with different colors and/or different portions around the perimeter of the rotation portion 214 may be illuminates to indicate different conditions and/or actuations of the rotation portion 214 and/or the actuation portion 216. For example, in response to an actuation of the actuation portion 216, the entire perimeter around the rotation portion 214 may be illuminated white (or blue) if a battery of the control device 200 has an appropriate amount of energy, and a segment of the perimeter around the rotation portion 214 (e.g., near the bottom of the rotation portion 214) may be illuminate red to indicate a low-battery condition (e.g., to indicate that the battery does not have an appropriate amount of energy).

Figure 4:
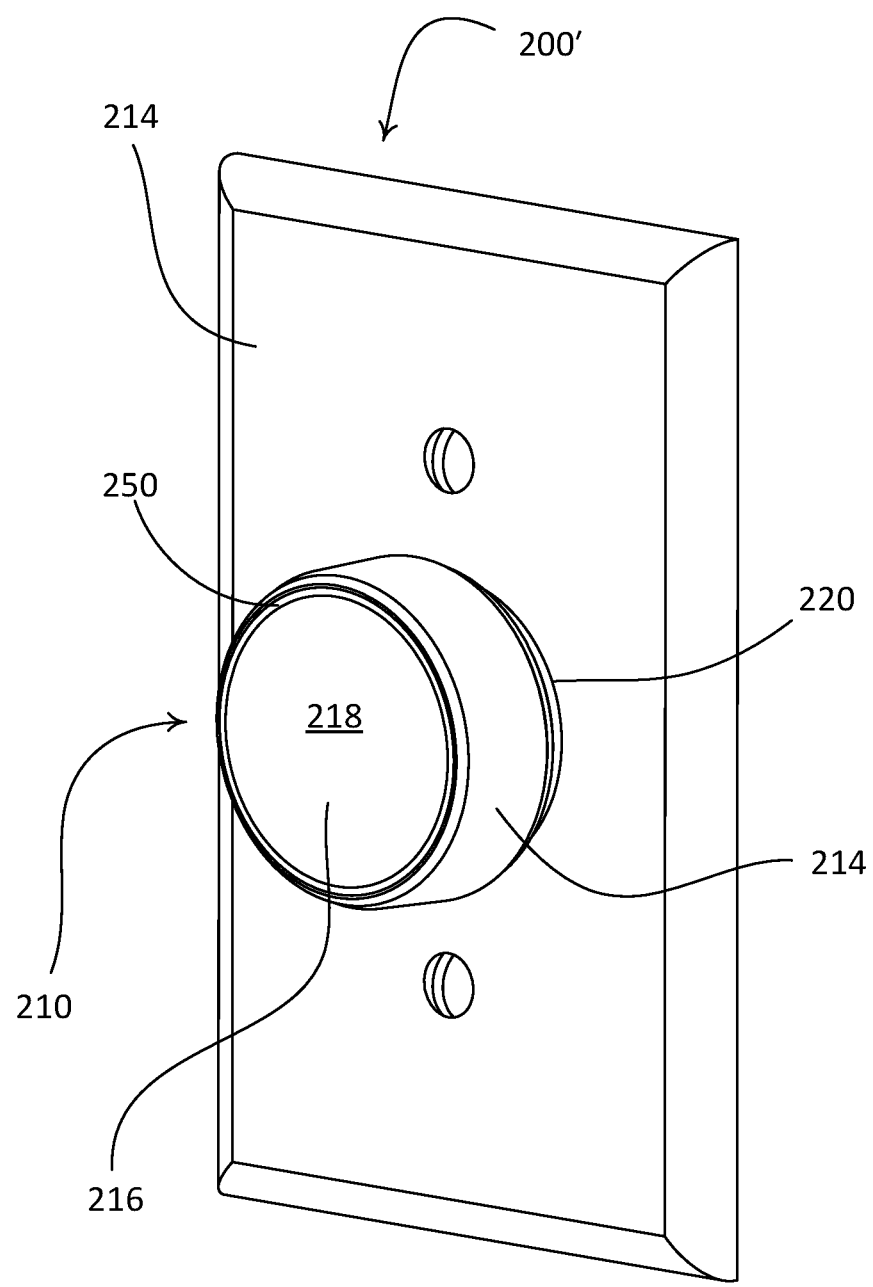
FIG. 4 is a perspective view of another example control device that may be deployed as a dimmer switch and/or a remote control device of the load control systems illustrated in FIGS. 1A and 1B.

FIG. 4 depicts another example control device 200' that may be deployed as the remote control device 116 in the load control system 100. The control device 200' may be very similar to the control device 200 of FIGS. 2, 3A-3D. However, the control device 200' may comprise a visible indicator 250 (e.g., a light bar or light ring), that may be illuminated to provide feedback (e.g., simple and advanced feedback). The visible indicator 250 may be used to provide feedback of the present and/or future intensity of the lighting devices paired with the control device 200'. The visible indicator 250 may be located at various locations of the control device 200', such as between the rotation portion 214 and the actuation portion 216 (e.g., attached to a periphery of the actuation portion 216). The visible indicator 250 may extend along the perimeter of the rotation portion 214 and/or the actuation portion 216, and/or be configured to move with the actuation portion 216 (e.g., when the actuation portion is actuated). The visible indicator 250 may have different shapes and/or other geometric properties. For example, the visible indicator 250 may form a complete or partial loop, the visible indicator 250 may be linear (e.g., substantially linear), the visible indicator 250 may have an irregular shape such as an irregular curve or twist, and/or the like. As referenced herein, a loop can be but is not required to be circular or curving. A complete loop may form a circle (e.g., as shown in FIG. 4), an oval, a rectangle, a triangle, a star, a diamond, etc., and a partial loop may include one or more parts of the forgoing structures. The visible indicator 250 may be illuminated by a plurality of light sources (e.g., LEDs) arranged in a circular pattern inside of the control device 200'.

Figure 5B:
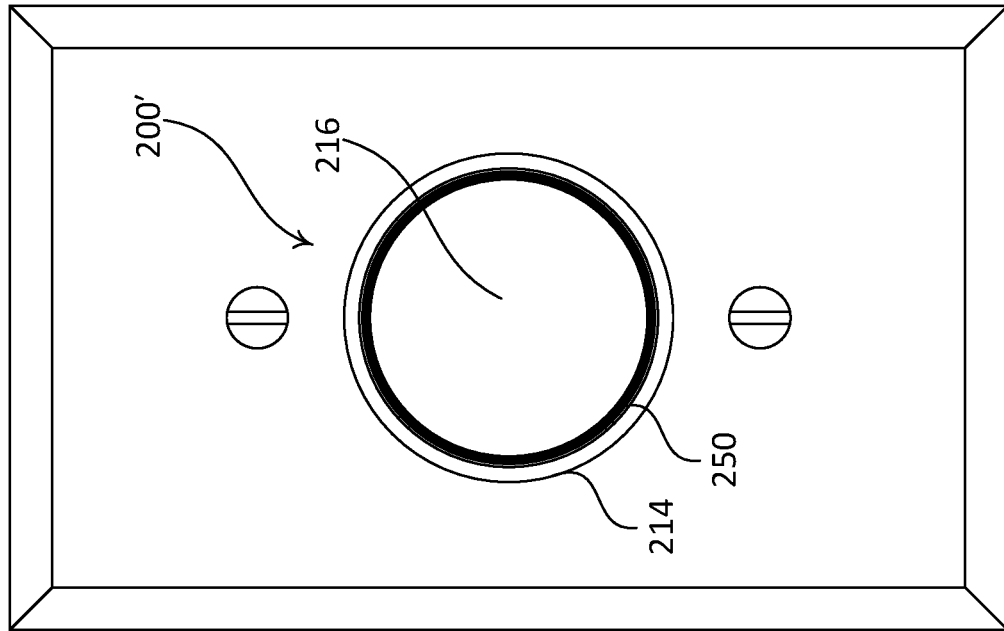
FIGS. 5A-5B illustrate different forms of simple feedback that may be provided by the control device of FIG. 4.
Figure 5A:
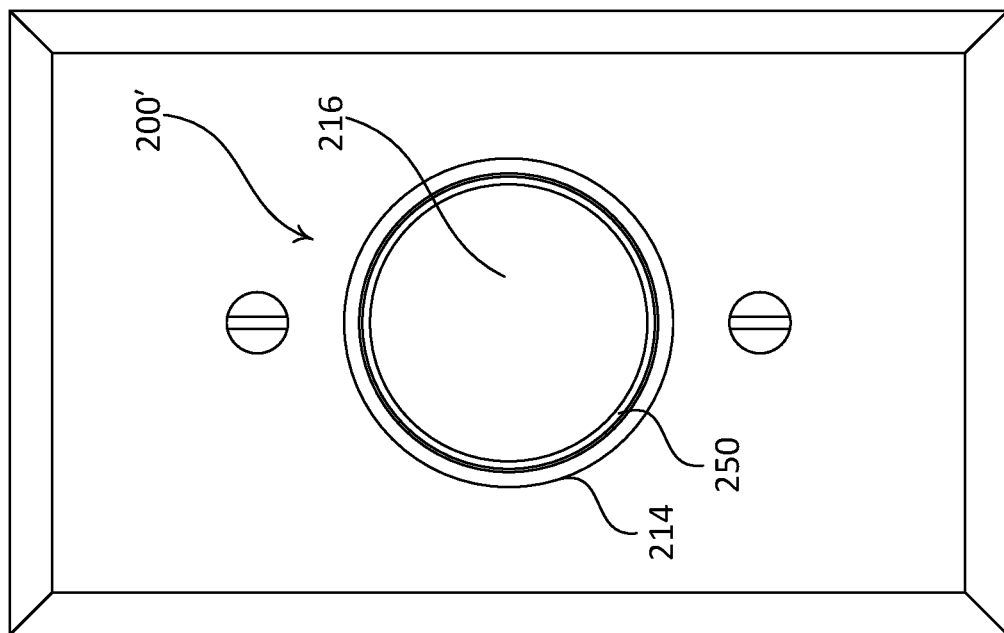

FIGS. 5A-5B illustrate the control device 200' providing an example of simple feedback on the visible indicator 250. As shown in FIG. 5B, the control device 200' may be configured to provide the feedback after the control device 200' has been activated. In addition, as described herein, the feedback provided by the visible indicator 250 may indicate the present and/or future intensity of the lighting devices paired with the control device 200' to a user interfacing with the control device 200'. For example, the control device 200' may be configured to provide the feedback upon detecting a user near the control device and/or upon a user interface event being detected on a user interface of the control device 200'. The user interface event may be an actuation of an actuation portion 216 or a rotation of a rotation portion 214. The feedback may indicate that the control device 200' is transmitting wireless communication signals (e.g., RF signals) in response to the activation. The control device 200' may keep the visible indicator 250 illuminated for the duration of the event that triggered the feedback (e.g., while the rotation portion 214 is being rotated). The control device 200' may be configured to continue to illuminate the visible indicator 250 for a few seconds (e.g., 1-2 seconds) after the event, and then turn off the visible indicator 250, for example, to conserve battery life.

The visible indicator 250 may be unlit (e.g., as shown in FIG. 5A) to provide feedback that the load control devices associated therewith are off. The LEDs that illuminate the visible indicator 250 may be turned on to a full intensity (e.g., as shown in FIG. 5B) when the load control devices associated therewith are on or a user interface event is detected. For example, the lighting device may be turned on in response to a toggle event recognized by actuating the actuation portion 216 or rotating the rotation portion 214. The LEDs illuminating the visible indicator 250 may be turned on to a full intensity to reflect the level of intensity of the lighting devices controlled by the control device 200'. When the actuation portion 216 is actuated (e.g., pressed), the visible indicator 250 may blink between the two states shown in FIGS. 5A and 5B to provide feedback that the actuation portion 1104 was pressed and the control device 200' is working.

The visible indicator 250 may be illuminated to provide the feedback in different manners (e.g., different intensities and/or colors) when the rotation portion 214 is being rotated. For example, as shown in FIG. 5B, the visible indicator 250 may be fully illuminated to and maintained at a maximum light bar intensity $L_{LB-MAX}$ (e.g., 100%) when the rotation portion 214 is being rotated clockwise or counterclockwise (e.g., to increase or decrease the intensity of the lighting device) to provide simple feedback. For example, the visible indicator 250 may be illuminated to a first mid-level light bar intensity $L_{LB-MID1}$ (e.g., 80%) that is less than the maximum light bar intensity $L_{LB-MAX}$ when the rotation portion 214 is being rotated clockwise (e.g., to raise the intensity of the lighting device) to provide simple feedback that the rotation portion 214 is being rotated. For example, the visible indicator 250 may be illuminated to a second mid-level light bar intensity $L_{LB-MID2}$ (e.g., 40%) that is less than the first mid-level light bar intensity $L_{LB-MID1}$ (and thus less than the maximum light bar intensity $L_{LB-MAX}$) when the rotation portion 214 is being rotated counter-clockwise (e.g., to lower the intensity of the lighting device) to provide simple feedback that the rotation portion 214 is being rotated.

Similarly, the visible indicator 250 may be illuminated with different colors to indicate different user inputs and/or the status of electrical loads or load control devices. For example, the visible indicator 250 may be illuminated with different colors to indicate that the intensity of a lighting load is being raised or lowered, a shade level is being raised or lowered, and/or a volume level is being raised or lowered. The visible indicator 250 may be illuminated with a red color when a lighting intensity is being raised and with a blue color when the lighting intensity is being lowered. In addition, the visible indicator 250 may be illuminated in response to an actuation of the actuation portion 216 to indicate that an electric load is being toggled on or off. For example, the visible indicator 250 may be illuminated to display an animation when a lighting load is being toggled on or off to provide simple feedback that the actuation portion 216 has been actuated (e.g., as shown in FIG. 3F).

The visible indicator 250 may be illuminated to indicate that the lighting device has reached a limit, such as the high-end intensity. For example, the control device 200' may be configured to provide a limit indication (e.g., a limit animation) by blinking or fluttering the visible indicator 250 (e.g., rapidly turn on and off numerous times over a period of time) when the lighting device has reached the high-end intensity. The control device 200' may be configured to determine that the lighting device is at the high-end intensity in response to received wireless communication signals. In addition, the control device 200' may be configured to keep track of and/or estimate the intensity of the lighting device in response to the rotation of the rotation portion 214 and provide the limit indication when the tracked intensity of the lighting device reaches the high-end intensity. Further, the control device 200' may be configured to provide the indication that the lighting device has reached the high-end intensity when the rotation portion 214 has been rotated (e.g., continuously rotated) by a predetermined threshold amount (e.g., approximately 210°). For example, rotation of the rotation portion 214 by the predetermined threshold amount may result in a change of the intensity level of the lighting device from the low-end intensity to the high-end intensity. The control device 200' may also indicate that the lighting device has reached another limit, such as the low-end intensity and/or color temperatures limits of the lighting device.

The visible indicator 250 may be illuminated to further indicate an amount of power being supplied to the lighting device. The control device 200' may be configured to illuminate portions of the visible indicator 250 to provide advanced feedback, for example, to indicate the intensity of the lighting device controlled by the control device 200'. For example, instead of illuminating the entire light bar of the visible indicator 250, the control device 200' may turn on one or more of the light sources to illuminate a portion of the visible indicator 250, and adjust the length of the illuminated portion in accordance with control applied by a user. For example, when the light bar of the visible indicator 250 is configured to have a circular shape, the illuminated portion may expand or contract around the circumference of the light bar in response to user interface events and/or adjustments in the status of electrical loads. The control device 200' may adjust the intensity of the LED that is illuminating an end point of the illuminated portion of the visible indicator 250 to provide adjustment of the end point of the illuminated portion as is described in greater detail herein.

Figure 6C:
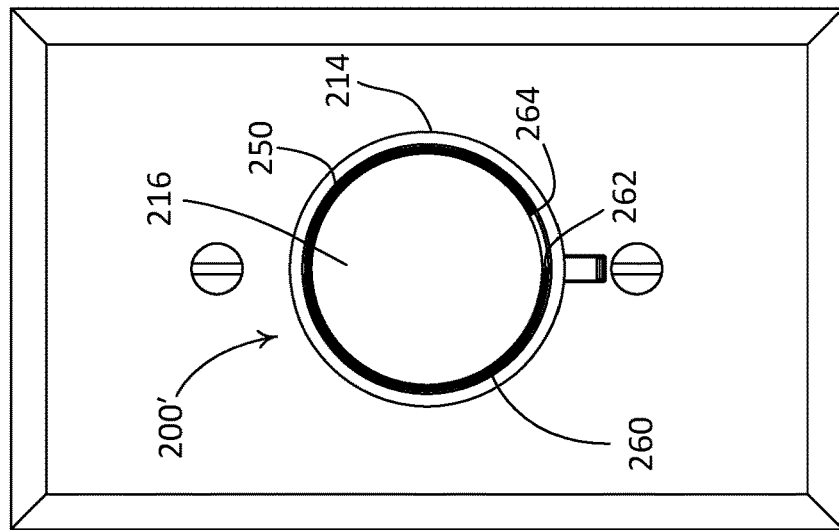
FIGS. 6A-6C illustrate different forms of advanced feedback that may be provided by the control device of FIG. 4.
Figure 6B:
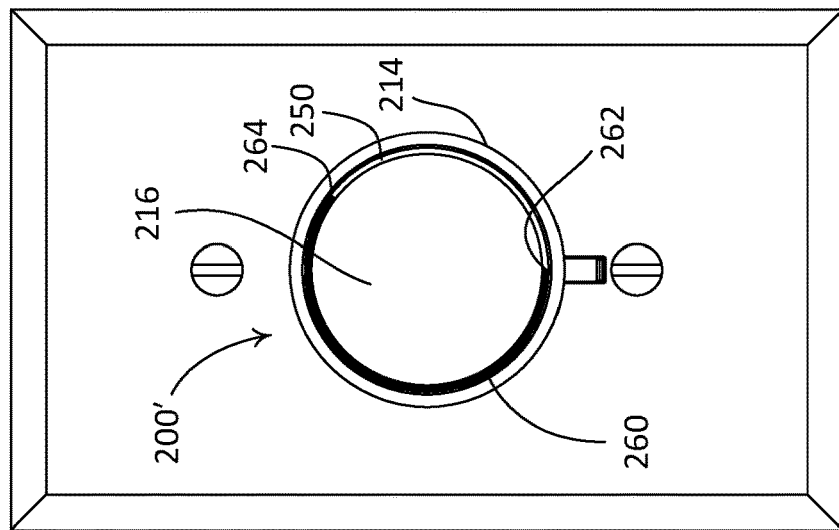
Figure 6A:
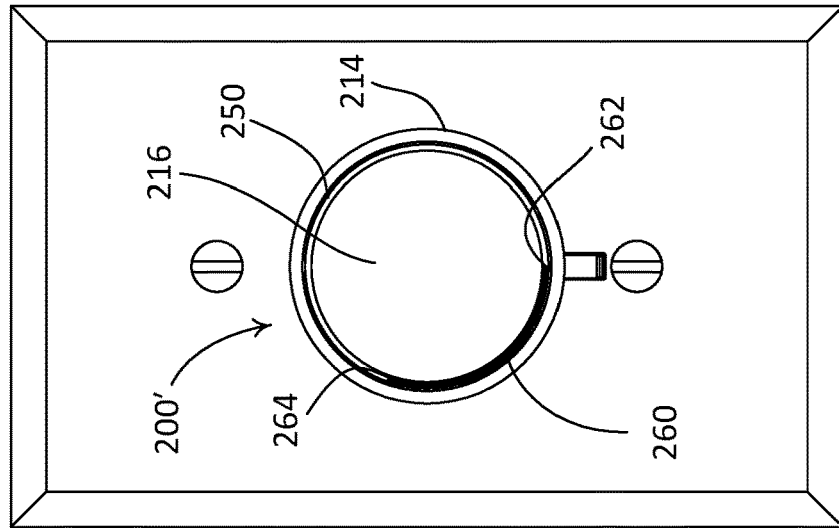

FIGS. 6A-6C illustrate the control device 200' providing an example of advanced feedback on the visible indicator 250. The feedback provided by the visible indicator 250 may indicate the present and/or future intensity of the lighting devices paired with the control device 200' to a user interfacing with the control device 200'. For example, FIGS. 6A-6C show an illuminated portion 260 of the visible indicator 250 expand and contract in one direction to provide an indication (e.g., a single indication) of the intensity of the lighting device. For example, the control device 200' may include a plurality of light sources (e.g., LEDs) configured to illuminate the visible indicator 250. In response to an actuation of the control device 200 to adjust the intensity of the lighting device, the control device 200' (e.g., a control circuit included therein) may illuminate a subset of the light sources such that the illuminated portion 260 of the visible indicator 250 is illuminated to indicate the intensity corresponding to the actuation. The illuminated portion 260 may begin at a starting point 262 (e.g., at the bottom of the visible indicator 250 as shown in FIG. 6A) and end at an end point 264 (e.g., along the circumference of the visible indicator 250). The length and/or intensity of the illuminated portion 260 of the visible indicator 250 may be indicative of the intensity of the lighting device. The subset of light sources may be illuminated uniformly to a common intensity. Alternatively, the subset of light sources may be illuminated to different intensities.

The control circuit of the control device 200' may be configured to increase the length of the illuminated portion 260 (e.g., cause the end point 264 of the illuminated portion to move in a clockwise direction as shown in FIGS. 6A-6C) when the intensity of the lighting device is being raised. The control circuit may be configured to decrease the length of the illuminated portion 260 (e.g., cause the end point 264 of the illuminate portion to move in a counterclockwise direction as shown in FIGS. 6A-6C) when the intensity of the lighting device is being lowered. This way, the illuminated portion 260 may expand and contract as the intensity of the lighting device is adjusted. For example, the visible indicator 250 may be illuminated to indicate that the intensity of the lighting device is approximately 30% as shown in FIG. 6A, approximately 60% as shown in FIG. 6B, and approximately 90% as shown in FIG. 6C. When the lighting device is at the high-end intensity (e.g., approximately full intensity), the entire visible indicator 250 may be illuminated. The visible indicator 250 may also be illuminated to provide the limit indication when the lighting device has reached the high-end intensity. For example, the control device 200' may be configured to blink or flutter the visible indicator 250 (e.g., turn on and off rapidly numerous times over a period of time) when the lighting device has reached the high-end intensity. When the control device 200' is configured to control multiple lighting device, and set respective light intensities of the multiple lighting loads to different values, the control device 200' may be configured to illuminate the visible indicator 250 to indicate an average of the respective intensities of the lighting devices, to indicate the intensity of a lighting device nearest to the control device 200', and/or the like.

The control device 200' may be configured to indicate a last-known intensity of the lighting load upon receiving a user input to turn on the lighting load. For example, before the lighting load was turned off, the control device 200' may store the intensity of the lighting load in a memory of the control device 200' while quickly decreasing the length of the illuminated portion 260 from the end point 264 to the starting point 262. Subsequently, when the control device 200' is actuated to turn the lighting load back on, the control device 200' may illuminate the visible indicator 250 to quickly increase the length of the illuminated portion 260 to correspond to the previously stored intensity of the lighting load. An example of a control device having a light bar is described in greater detail in commonly-assigned U.S. Patent Application Publication No. 2017/0354011, published Dec. 7, 2017, entitled USER INTERFACE FOR A CONTROL DEVICE, the entire disclosure of which is hereby incorporated by reference.

FIGS. 7A and 7B are front and rear exploded perspective views of an example remote control device 310 that may be deployed as the remote control device 116 in the load control system 100 shown in FIGS. 1A and 1B, the control device 200 shown in FIG. 2, and/or the control device 200' shown in FIG. 4. The remote control device 310 may be configured to be mounted over an actuator of a standard light switch 312 (e.g., a toggle actuator of a single pole single throw maintained mechanical switch). The remote control device 310 may be installed over of an existing faceplate 316 that is mounted to the light switch 312 (e.g., via faceplate screws 318). The remote control device 310 may include a base portion 320 and a control unit 330 that may be operably coupled to the base portion 320. The control unit 330 may be supported by the base portion 320 and may include a rotation portion 332 (e.g., an annular rotation portion) that is rotatable with respect to the base portion 320.

As shown in FIG. 7A, the control unit 330 may be detached from the base portion 320. The base portion 320 may be attached (e.g., fixedly attached) to a toggle actuator 314 and may be configured to maintain the toggle actuator 314 in the on position. The toggle actuator 314 may be received through a toggle actuator opening 322 in the base portion 320. A screw 324 may be tightened to attach (e.g., fixedly attached) the base portion 320 to the toggle actuator 314. In this regard, the base portion 320 may be configured to prevent a user from inadvertently switching the toggle actuator 314 to the off position when the remote control device 310 is attached to the light switch 312. When the control unit 330 is coupled to the base portion 320, the rotation portion 332 may be rotatable in opposed directions about the base portion 320 (e.g., in the clockwise and/or counter-clockwise directions). The base portion 320 may be configured to be mounted over the toggle actuator 314 of the switch 312 such that the rotational movement of the rotation portion 332 may not change the operational state of the toggle actuator 314 (e.g., the toggle actuator 314 may remain in the on position to maintain functionality of the remote control device 310).

The control unit 330 may comprise an actuation portion 334. The actuation portion 334 may in turn comprise a part or an entirety of a front surface of the control unit 330. For example, the control unit 330 may have a circular surface within an opening defined by the rotation portion 332. The actuation portion 334 may comprise a part of the circular surface (e.g., a central area of the circular surface) or approximately the entire circular surface. The actuation portion 334 may be received in a central circular opening defined by the rotation portion 332. In an example, the actuation portion 334 may be configured to move towards the light switch 312 (e.g., through the central opening of the rotation portion 332) to actuate a mechanical switch (not shown) inside the control unit 330 as will be described in greater detail below. When the actuation portion 334 is in the idle position, a front surface of the actuation portion 334 may be located in a first plane that may be parallel to a front surface of the base portion 320. The rotation portion 332 and/or the actuation portion 334 may be pushed into towards the base portion 320 to cause the front surface of the actuation portion 334 to be in a second plane that is parallel to the front surface of the faceplate and closer to the faceplate than the first plane. In addition, the rotation portion 332 may be connected to the actuation portion 334 and may move with the actuation portion to actuate the mechanical switch when the actuation portion 332 is actuated.

The control unit 330 may be released from the base portion 320. For example, a control unit release tab 326 may be provided on the base portion 320. By actuating the control unit release tab 326 (e.g., pushing up towards the base portion or pulling down away from the base portion), a user may remove the control unit 330 from the base portion 320. The control unit 330 may comprise one or more clips 338 that may be retained by respective locking members 328 connected to the control unit release tab 326 when the base portion 320 is in a locked position. The one or more clips 338 may be released from the respective locking members 328 of the base portion 320 when the control unit release tab 326 is actuated (e.g., pushed up towards the base portion or pulled down away from the base portion) to put the base portion 320 in an unlocked position. In an example, the locking members 328 may be spring biased into the locked position and may automatically return to the locked position after the control unit release tab 326 is actuated and released. In an example, the locking members 328 may not be spring biased, in which case the control unit release tab 326 may be actuated to return the base portion 320 to the locked position.

In addition, the control unit 330 may be installed on the base portion 320 without adjusting the base portion 320 to the unlocked position. For example, the one or more clips 338 of the control unit 330 may be configured to flex around the respective locking members 328 of the base portion and snap into place, such that the control unit 330 is fixedly attached to the base portion.

The control unit 330 may be released from the base portion 320 to access one or more batteries 340 through a rear side 339 of the control unit 330 (e.g., as shown in FIG. 7B). The batteries 340 may provide power to at least the remote control device 310. The batteries 340 may be held in place by a battery retention strap 342, which may also operate as an electrical contact for the batteries. The battery retention strap 342 may be loosened by untightening a battery retention screw 344 to allow the batteries 340 to be removed and replaced. Although FIG. 7B depicts the batteries 340 as being located in the control unit 330, it should be appreciated that the batteries 340 may be placed elsewhere in the remote control device 310 (e.g., in the base portion 320) without affecting the functionality of the remote control device 310.

Figure 7C:
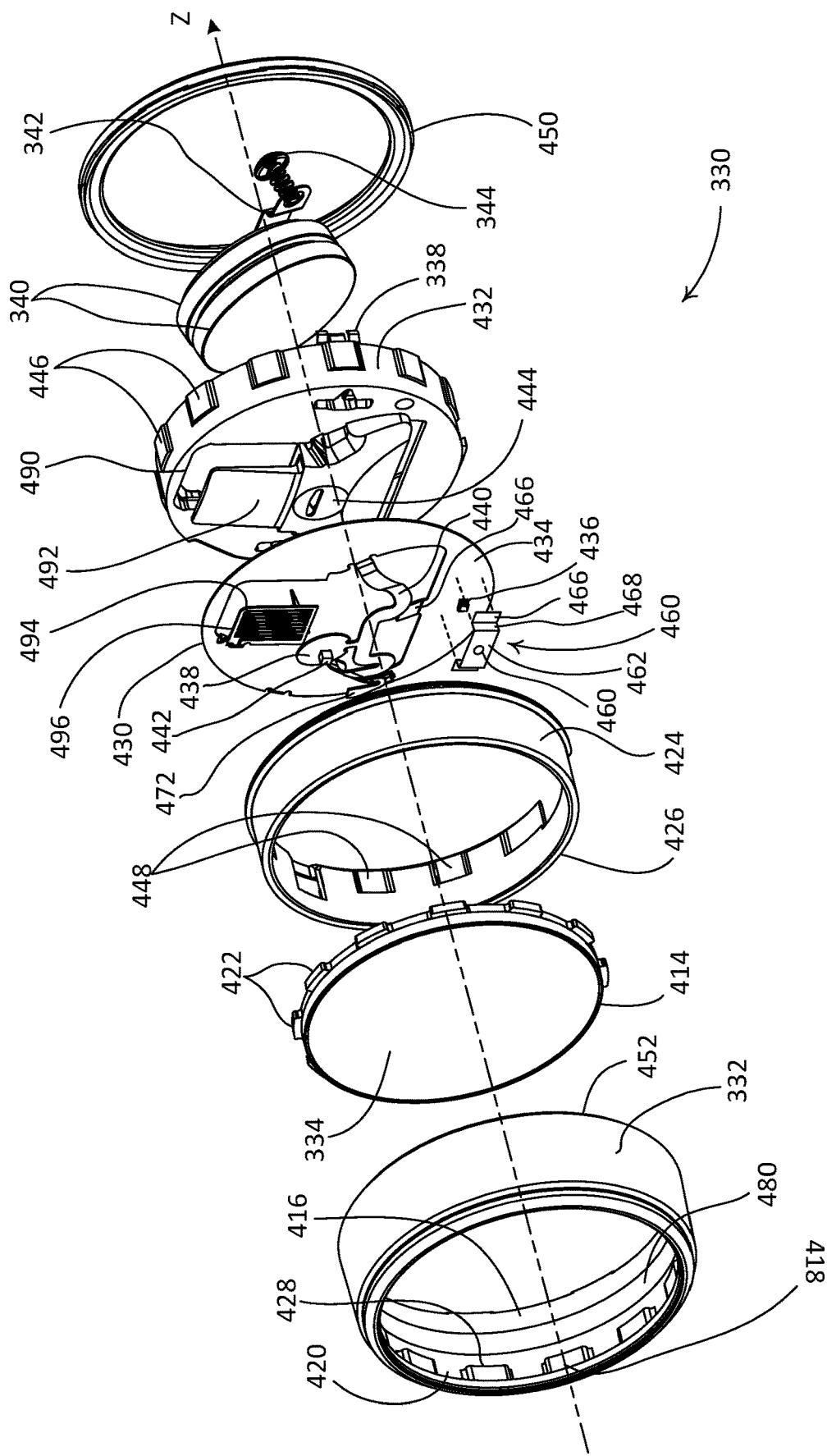
FIG. 7C is a front exploded view of the control unit of the remote control device depicted in FIG. 7A.
Figure 7D:
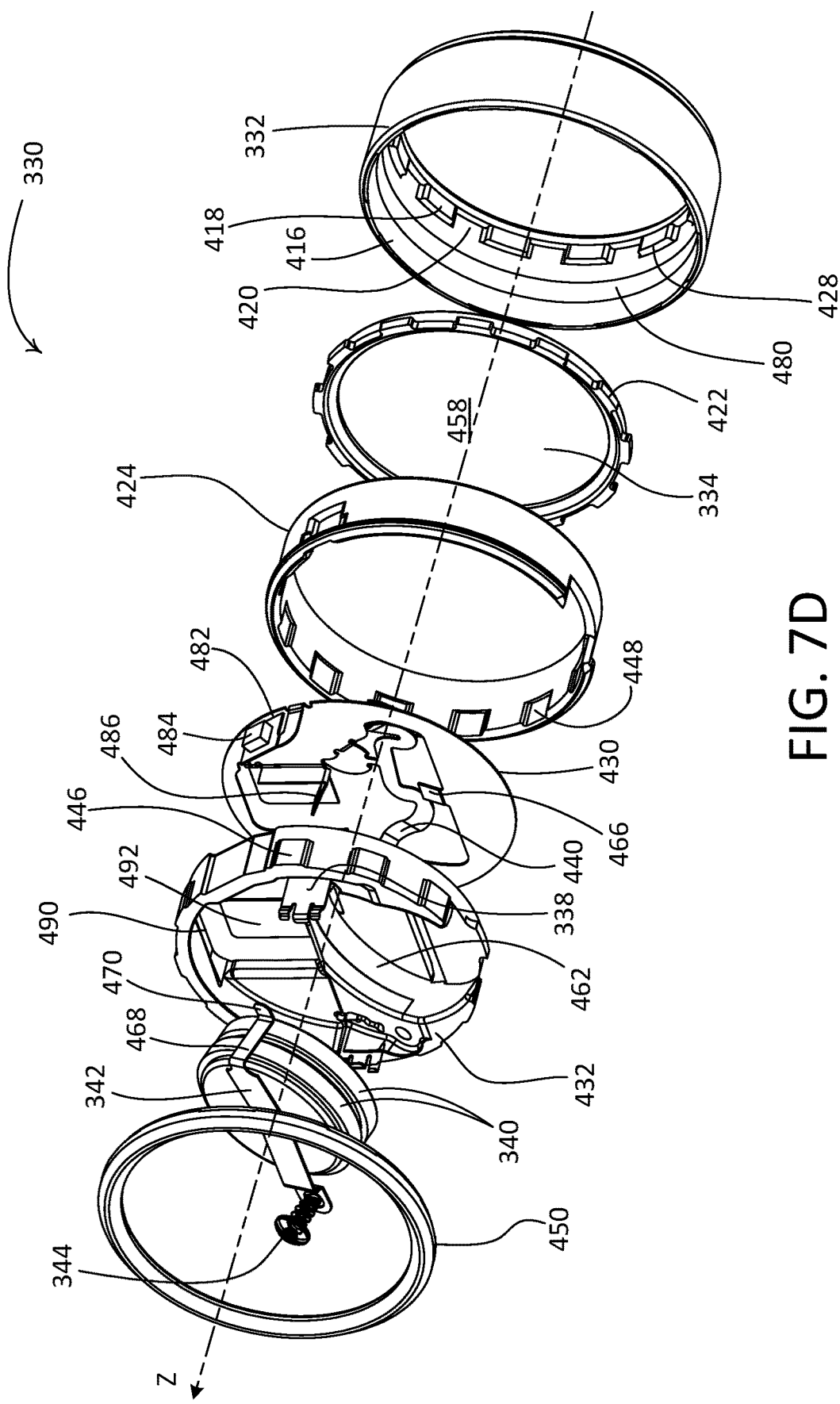
FIG. 7D shows a rear exploded view of the control unit of the example remote control device depicted in FIG. 7C.

FIG. 7C is a front exploded view and FIG. 7D is a rear exploded view of the control unit 330 of the remote control device 310. The actuation portion 334 may be received within an opening defined by the rotation portion 332. The rotation portion 332 may comprise an inner surface 416 having tabs 418 surrounding the circumference of the rotation portion. The tabs 418 may be separated by notches 420 that are configured to receive engagement members 422 of the actuation portion 334 to thus engage the actuation portion 334 with the rotation portion 332. The control unit 330 may also comprise a bushing 424 that is received within the rotation portion 332, such that an upper surface 426 of the busing may contact lower surfaces 428 of the tabs 418 inside of the rotation portion. When the rotation portion 334 is rotated, the actuation portion 334 may rotate with the rotation portion. The engagement members 422 of the actuation portion 334 may be able to move through the notches 420 in a z-direction (e.g., towards the base portion), such that the actuation portion 334 may be able to move in the z-direction.

The control unit 330 may further comprise a flexible printed circuit board (PCB) 430 that may be arranged over a carrier 432. The flexible PCB 430 may comprise a main portion 434 on which most of the control circuitry of the control unit 330 (e.g., including a control circuit) may be mounted. The control unit 330 may comprise one or more light sources, such as a light-emitting diode (LED) 436 mounted to a front surface of the flexible PCB 430 near the bottom of the flexible PCB to illuminate an illuminated portion of the actuation portion 334 (e.g., the illuminated portion 230b of the control device 200 shown in FIG. 3B).

The control unit 330 may comprise a mask 460 configured to be mounted over the LED 436. The mask 460 may comprise a folded piece of a flexible opaque material, such as mylar. The mask 460 may comprise a main portion 462 having an aperture 462 through which light from the LED 436 may shine to generate the illuminated portion on the actuation portion 334. The mask 460 may comprise feet 466 configured to rest on and/or be attached to the flexible PCB 430, and legs 468 configured to hold the main portion 362 and the aperture 464 above the LED 436. The mask 460 may aide in generating a sharp circle of light on, around, or proximate to the actuation portion 334 (e.g., as shown in FIG. 3B). The actuation portion 334 may be made of white plastic, which may diffuse the light that shines through the aperture 462 and onto an inner surface of the actuation portion. In addition, the actuation portion 334 may be made of clear plastic with the inner surface coated with paint (e.g., white paint), which may provide for a sharper circle of light on the actuation portion 334. The mask 460 may be omitted to generate a more diffuse circle of light on the actuation portion 334 (e.g., as shown in FIG. 3A).

The flexible PCB 430 may comprise a switch tab 438 that may be connected to the main portion 434 (e.g., via flexible arms 440). The switch tab 438 may have a mechanical tactile switch 442 mounted thereto. The switch tab 438 of the flexible PCB 430 may be configured to rest on a switch tab surface 444 on the carrier 432. The carrier 432 may comprise engagement members 446 configured to be received within notches 448 in the bushing 424. A ring 450 may snap to a lower surface 452 of the rotation portion to hold the control unit 330 together. The clips 338 may be attached to the carrier 432 to allow the control unit 330 to be connected to the base portion.

When the actuation portion 334 is pressed, the actuation portion 334 may move along the z-direction until an inner surface 458 of the actuation member actuates the mechanical tactile switch 442. The actuation portion 334 may be returned to the idle position by the mechanical tactile switch 442. In addition, the control unit 330 may comprise an additional return spring for returning the actuation portion 334 to the idle position. In some examples, actuations of the actuation portion 334 may not cause the actuation portion to move (e.g., the actuation portion 334 may substantially maintain its position along the z-direction). For example, the front surface of the actuation portion 334 may be a touch sensitive surface (e.g., a capacitive touch surface) configured to detect a user input via a point actuation and/or a gesture.

The batteries 340 may be adapted to be received within a battery recess 462 in the carrier 432 as shown in FIG. 7D. The batteries 340 may be held in place by the battery retention strap 342, which may also operate as a negative electrical contact for the batteries and tamper resistant fastener for the batteries. The flexible PCB may comprise a contact pad 466 that may operate as a positive electrical contact for the batteries 340. The battery retention strap 342 may comprise a leg 468 that ends in a foot 470 that may be electrically connected to a flexible pad 472 (e.g., as shown in FIG. 7C) on the flexible PCB 430. The battery retention strap 342 may be held in place by the battery retention screw 344 received in an opening 476 in the carrier 432. When the battery retention screw 344 is loosened and removed from the opening 476, the flexible pad 472 may be configured to move (e.g., bend or twist) to allow the battery retention strap 342 to move out of the way of the batteries 340 to allow the batteries to be removed and replaced.

The control unit 330 may further comprise a magnetic strip 480 located on the inner surface 416 of the rotation portion 332 and extending around the circumference of the rotation portion. The flexible PCB 430 may comprise a rotational sensor pad 482 on which a rotational sensor (e.g., a Hall effect sensor integrated circuit 484) may be mounted. The rotational sensor pad 482 may be arranged perpendicular to the main portion 434 of the flexible PCB 430 as shown in FIG. 7D. The magnetic strip 480 may comprise a plurality of alternating north (e.g., positive) and south (e.g., negative) polarized sections, and the Hall effect sensor integrated circuit 484 may comprise two sensor circuits operable to detect the passing of the north and south polarized sections of the magnetic strip as the rotation portion 332 is rotated. Accordingly, the control circuit of the control unit 330 may be configured to determine the rotational speed and direction of rotation of the rotation portion 332 in response to the Hall effect sensor integrated circuit 484. The flexible PCB 430 may also comprise a programming tab 486 to allow for programming of the control circuit of the control unit 330.

As shown in FIG. 7D, the carrier 432 may comprise an actuator opening 490 adapted to receive the toggle actuator of the light switch when the control unit 330 is mounted to the base portion. The carrier 432 may comprise a flat portion 492 that may prevent the toggle actuator of the light switch from extending into the inner structure of the control unit 330 (e.g., if the toggle actuator is particularly long). The flexible PCB 430 may also comprise an antenna 494 on an antenna tab 496 that may lay against the flat portion 492 in the actuator opening 490.

While not shown in FIG. 7C, the control unit 330 may comprise a plurality of LEDs arranged around the perimeter of the flexible PCB 430, for example, for illuminating the visible indicator 250 of the control device 200' shown in FIGS. 4-6C.

The control unit 330 may also be configured to shine light out the rear surface 339 of the control unit and onto the faceplate 312. The control unit 330 may comprise a plurality of LEDs (not shown) mounted to the flexible PCB 430 and a light guide (not shown) for conducting the light generated by the LEDs to shine out of the rear side 339 of the control unit 330. For example, the light guide may be cylindrical in shape and may be located adjacent to an interior surface of the rotation portion 332. The light guide may be configured to shine light out through a gap between the control unit 330 and the base portion 320. For example, the control unit 330 may comprise a plurality of rear-facing LEDs mounted to a rear surface of the flexible PCB 430. In addition, the control unit 330 may comprise a plurality of side-firing LEDs mounted to the front or rear side of the flexible PCB 430 and configured to shine on the light guide. Further, the base portion 320 may be at least partially transparent or translucent in order to shine light emitted from the rear side 339 of the control unit 330 out between the control unit 330 and the faceplate 312.

FIG. 8A is a front exploded perspective view of another example remote control device 510 that may be deployed as the remote control device 116 in the load control system 100 shown in FIGS. 1A and 1B, the control device 200 shown in FIG. 2, and/or the control device 200' shown in FIG. 4. The remote control device 510 may be configured to be mounted over a toggle actuator 514 of a standard light switch 512 (e.g., a toggle actuator of a single pole single throw maintained mechanical switch). The remote control device 510 may be installed over of an existing faceplate 516 that is mounted to the light switch 512 (e.g., via faceplate screws 518). The remote control device 510 may include a mounting assembly 520 (e.g., a base portion) and a control unit 530 that may be operably coupled to the mounting assembly 520. FIG. 8B is a rear perspective view of the control unit 530 of the remote control device 510 of FIG. 8A. The control unit 530 may be supported by the mounting assembly 520 and may include a rotation portion 532 (e.g., an annular rotation portion) and an actuation portion 534. The rotation portion 532 may be rotatable with respect to the mounting assembly 520.

As shown in FIG. 8A, the control unit 530 may be detached from the mounting assembly 520. The mounting assembly 520 may be attached (e.g., fixedly attached) to the toggle actuator 514 and may be configured to maintain the toggle actuator 514 in the on position. The mounting assembly 520 may include a base 521 that defines a toggle actuator opening 522 that extends therethrough and that is configured to receive at least a portion of the toggle actuator 514. The mounting assembly 520 may include an engagement mechanism, such as a bar 525, that may be configured to engage the toggle actuator 514, for example when the toggle actuator 514 is received in the toggle actuator opening 522. The bar 525 may be configured to engage the toggle actuator 514 such that the mounting assembly 520 is secured in position relative to the toggle actuator 514. The bar 525 may be operably coupled to the base 521, and may be configured to be moveable, for instance translatable, relative to the base 521. The bar 525 may be configured to be translated within the toggle actuator opening 522 such that the bar 525 engages with the toggle actuator 514, thereby fixedly attaching the mounting assembly 520 in position relative to the toggle actuator 514 of the light switch 512 when the toggle actuator 514 is in the up position or the down position. In this regard, the mounting assembly 520 may be configured to prevent a user from inadvertently switching the toggle actuator 514 to the off position when the remote control device 510 is attached to the light switch 512.

The control unit 530 may be released from the mounting assembly 520. For example, a control unit release tab 526 may be provided on the mounting assembly 520. By actuating the control unit release tab 526 (e.g., pushing up towards the base portion or pulling down away from the base portion), a user may remove the control unit 530 from the mounting assembly 520. The mounting assembly 520 may include one or more engagement features that are configured to engage with complementary engagement features of the control unit 530. For example, as shown the base 521 of the mounting assembly 520 may include resilient snap-fit connectors 524, and the control unit 530 may define corresponding recesses 525 that are configured to receive the snap-fit connectors 524. The mounting assembly 520 may include a release mechanism that is operable to cause the control unit 530 to be released from an attached position relative to the mounting assembly 520. As shown, the base 521 of the mounting assembly 520 may include a release tab 526 that may be actuated (e.g., pushed) to release the control unit 530 from the mounting assembly 520. In operation, the release tab 526 may be pressed up toward the base 521 to allow the lowermost snap-fit connector 524 adjacent to the release tab 526 to be removed from the corresponding lower recess 525 of the control unit 530, such that the control unit 530 may be released from the mounting assembly 520. When the control unit 530 is attached to the mounting assembly 520, the uppermost snap-fit connector 524 may first be positioned in the corresponding upper recess 525 of the control unit 530. The lower portion of the control unit 530 may then be pressed toward the base 521 to allow the lower snap-fit connector 524 to be received into the lower recess 525 of the control unit 530.

The control unit 530 may be released from the mounting assembly 520 to access one or more batteries 540 through a rear side 539 of the control unit 530 (e.g., as shown in FIG. 8B). The batteries 540 may provide power to at least the remote control device 510. The control unit 530 may include a battery retention strap 542 that may be configured to hold the battery 540 in place between the battery retention strap 542 and a printed circuit board (PCB) 544 of the control unit 530. The battery retention strap 542 may be configured to operate as a first electrical contact for the battery 540. A second electrical contact may be located on a rear-facing surface of the PCB 544. In an example of removing the battery 540 from the control unit 530, the control unit 530 may be detached from the mounting assembly 520, for instance as described herein, and the battery 540 may be slid out from between the battery retention strap 542 and the PCB 544. The PCB 544 may define an actuator opening 546 that extends therethrough and that may be configured to receive at least a portion of the toggle actuator 514 of the light switch 512 when the control unit 530 is mounted to the mounting assembly 520.

Figure 8C:
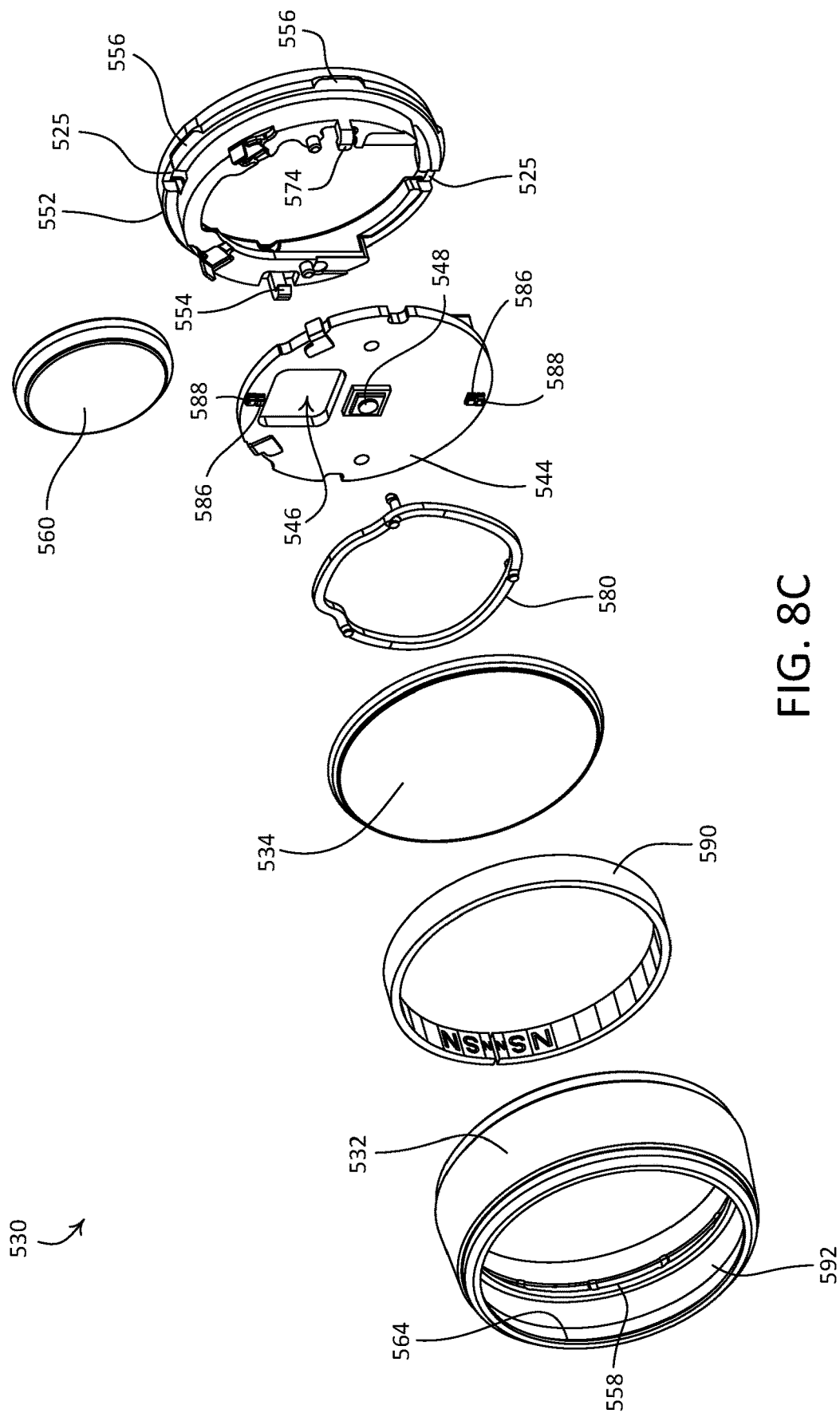
FIG. 8C is a front exploded view of the control unit of the remote control device depicted in FIG. 8A.
Figure 8D:
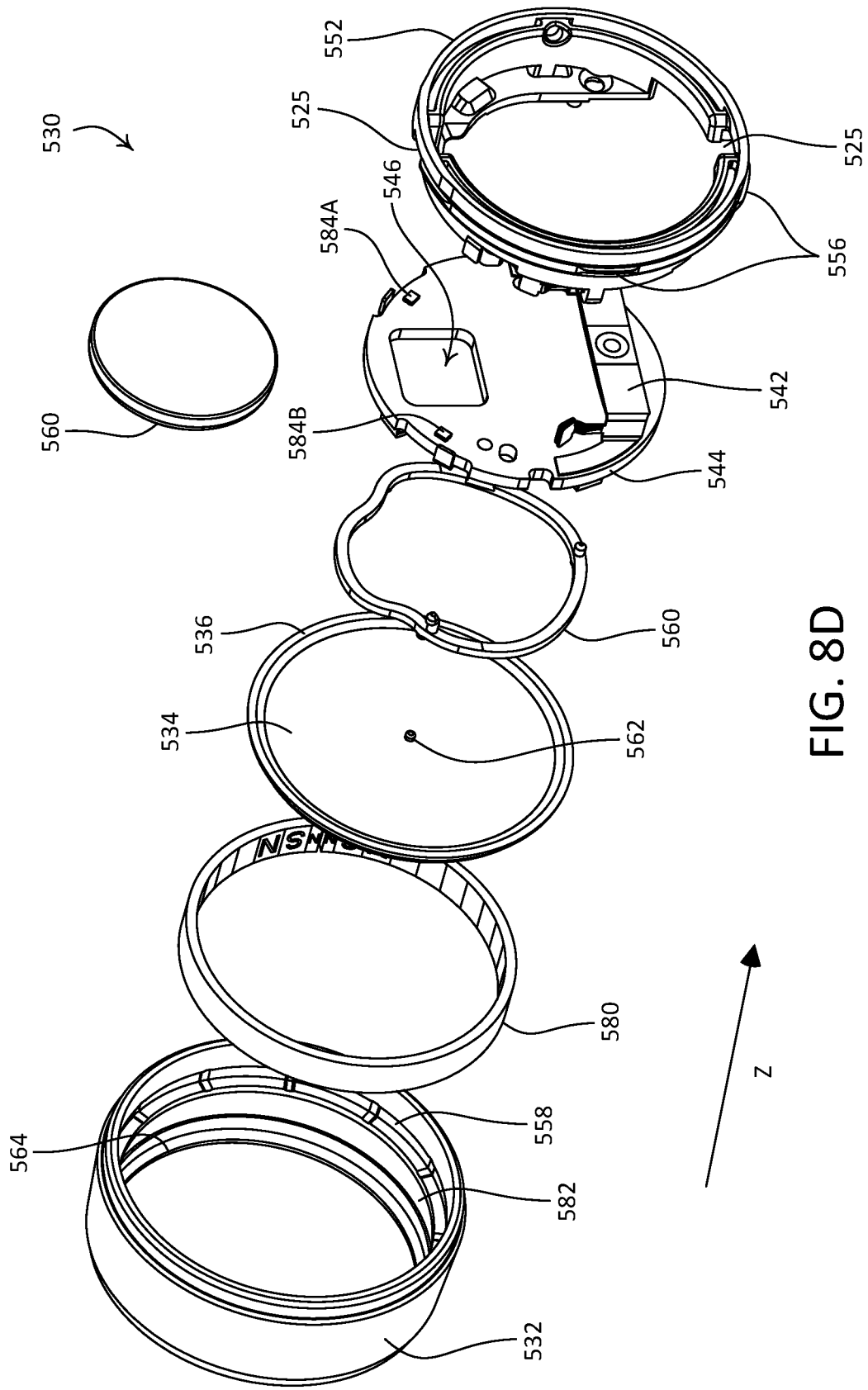
FIG. 8D shows a rear exploded view of the control unit of the example remote control device depicted in FIG. 8C.

FIG. 8C is a front exploded view and FIG. 8D is a rear exploded view of the control unit 530 of the remote control device 510. The PCB 544 may include a mechanical tactile switch 548 that may be mounted to a front-facing surface of the PCB 544. Control circuitry of the control unit 530 may be mounted to the PCB 544, for example to the one or both of the front-facing and rear-facing surfaces. The control unit 530 may include an attachment portion 552 that is configured to carry one or more components of the control unit 520, such as the PCB 544. For example, as shown the PCB 544 may be attached to the attachment portion 552 via snap-fit connectors 554. The attachment portion 552 may include a plurality of tabs 556 arranged around a circumference of the attachment portion 552. The tabs 556 may be configured to be received within corresponding channels 558 defined by the rotation portion 532, to thereby couple the rotation portion 532 to the attachment portion 552 and allow for rotation of the rotation portion 532 around the attachment portion 552. As shown, the attachment portion 552 may define the recesses 525. When the control unit 530 is connected to the mounting assembly 520, the snap-fit connectors 524 of the mounting assembly 520 may be received in the recesses 525 of the attachment portion 552. The attachment portion 552 and the PCB 544 may remain fixed in position relative to the mounting assembly 520 as the rotation portion 532 is rotated around the attachment portion 552. When the control unit 530 is attached to the mounting assembly 520, a portion of the toggle actuator 514 of the light switch 512 may be received in the actuator opening 546 of the PCB 544, such that the rotation portion 532 rotates about the toggle actuator 514 when operated.

The control unit 530 may include a resilient return spring 560 that may be located between the actuation portion 534 and the PCB 544. The return spring 560 may be configured to be attached to the PCB 544. As shown in FIG. 35, the actuation portion 534 may define a projection 562 that extends rearward from an inner surface of the actuation portion 524. When a force is applied to the actuation portion 534 (e.g., when the actuation portion 534 is pressed by a user of the remote control device 600), the actuation portion 534 may move in the direction Z until the projection 562 actuates the mechanical tactile switch 548. The return spring 580 may compress under application of the force. When application of the force is ceased (e.g., the user no longer presses the actuation portion 534), the return spring 560 may decompress, thereby to biasing the actuation portion 534 forward such that the actuation portion 534 abuts a rim 564 of the rotation portion 532. In this regard, the return spring 560 may operate to return the actuation portion 534 from an activated (e.g., pressed) position to a rest position.

The control unit 530 may include a magnetic strip 580 that may be disposed along an inner surface 582 of the rotation portion 532. The magnetic strip 580 may extend around an inner circumference of the rotation portion 522. The control unit 520 may include one or more rotational sensors 584A, 584B that may be mounted on the PCB 544. For example, the rotational sensors 584A, 584B may each comprise a Hall effect sensor integrated circuit. The magnetic strip 580 may include a plurality of alternating north and south polarized sections, and the rotational sensors 584A, 584B may be operable to detect passing of the north and south polarized sections of the magnetic strip 580 as the rotation portion 532 is rotated about the attachment portion 552. The control circuit of the control unit 530 may be configured to determine a rotational speed and/or direction of rotation of the rotation portion 532 in response to the rotational sensors 584A, 584B.

As shown, the control unit 530 may include two pairs of light-emitting diodes (LEDs) mounted to a front surface of the PCB 564, where each pair of LEDs comprises a first LED 586 of a first color (e.g., white or blue) and a second LED 588 of a second color (e.g., red). The first pair of LEDs 586, 588 may be located near the top of the control unit 530 adjacent to a perimeter of the PCB 564 as shown in FIG. 7C, and the second pair of LEDs 586, 588 may be located near the bottom of the control unit 530 adjacent to the perimeter of the PCB 564. The control unit 530 may be configured to control the LEDs 586, 588 to illuminate an illuminated portion near the top of the actuation portion 534 (e.g., the illuminated portion 230a of the control device 200 shown in FIG. 3A).

The control unit 530 may be configured to be mounted to the mounting assembly 530 in a first orientation (e.g., a first vertical orientation) in which the toggle actuator 514 of the light switch 512 is in an up position (e.g., as shown in FIG. 8A), and a second orientation (e.g., a second vertical orientation) in which the toggle actuator 514 is in a down position. The control unit 530 may comprise an orientation sensing circuit (not shown), such that the control unit 530 may be configured to determine an orientation of the control unit. For example, through the use of the orientation sensing circuit, the control unit 530 may determine its orientation relative to the space where it is installed (e.g., based on gravity) and/or its orientation relative to another component, such as the faceplate 516, the toggle actuator 514 of the light switch 512, etc. For example, the control unit 530 may be configured to determine whether the control unit 530 is attached to the mounting assembly 520 in the first orientation or the second orientation using the orientation sensing circuit. The control unit 530 may be configured to illuminate one of the first LEDs 586 to illuminate the illuminated portion near the top of the actuation portion 534 (e.g., white or blue) depending on whether the control unit 530 is mounted in the first orientation or the second orientation. The control unit 530 may be configured to illuminate one of the second LEDs 588 to illuminate a portion of the actuation portion 534 near the bottom of the actuation portion 534 (e.g., red) to display a low-battery indication. The control unit 530 may be configured to illuminate both LEDs 586, 588 of one of the pairs of LEDs to illuminate the illuminated portion near the top of the actuation portion 534 different colors depending on whether the rotation portion 532 is rotated to adjust the color temperature of the lighting device. For example, the illuminated portion may be illuminated blue or a cool-white color when the rotation portion 532 is being rotated clockwise to increase the color temperature towards a cool-white color temperature $T_{CW}$ and illuminated red or a warm-white color when the rotation portion 532 is being rotated counter-clockwise to decrease the color temperature towards a warm-white color temperature $T_{WW}$.

While not shown in FIG. 8C, the control unit 520 may comprise a plurality of LEDs arranged around the perimeter of the PCB 564, for example, for illuminating the visible indicator 250 of the control device 200' shown in FIGS. 4-6C.

The control unit 530 may also be configured to shine light out the rear side 539 of the control unit and onto the faceplate 512. The control unit 530 may comprise a plurality of LEDs (not shown) mounted to the flexible PCB 564 and a light guide (not shown) for conducting the light generated by the LEDs to shine out of the rear side 539 of the control unit 530. For example, the light guide may be cylindrical in shape and may be located adjacent to an interior surface of the rotation portion 532. The light guide may be configured to shine light out through a gap between the control unit 530 and the base portion 520. For example, the control unit 530 may comprise a plurality of rear-facing LEDs mounted to a rear surface of the flexible PCB 564. In addition, the control unit 530 may comprise a plurality of side-firing LEDs mounted to the front or rear side of the flexible PCB 564 and configured to shine on the light guide. Further, the mounting assembly 520 may be at least partially transparent or translucent in order to shine light emitted from the rear side 539 of the control unit 530 out between the control unit 530 and the faceplate 512.

Figure 8E:
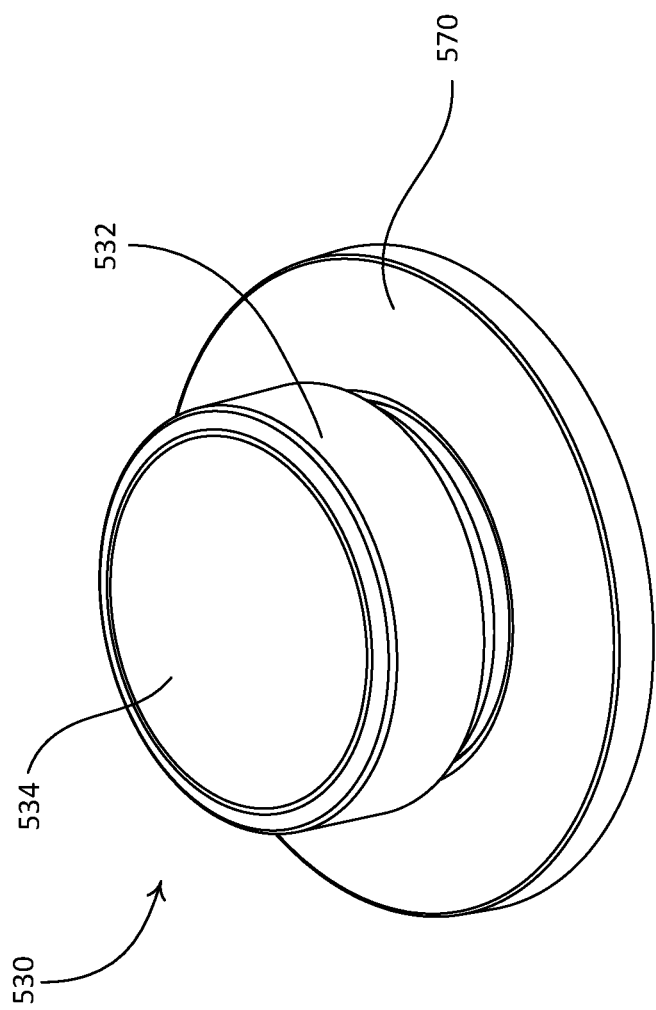
FIG. 8E is a perspective view of the control unit of FIG. 8A mounted to a pedestal in a horizontal orientation.

In addition, the control unit 530 may be configured to be mounted in a horizontal orientation. FIG. 8E is a perspective view of the control unit 530 mounted to a pedestal 570 in the horizontal orientation. The control unit 530 may be mounted to the pedestal 570, so that the control unit 530 may be placed on a horizontal surface, such as a table top. The control unit 570 may be configured to determine that its in the horizontal orientation in response to the orientation sensing circuit. The control unit 530 may be configured to illuminate one or the other of the first LEDs 586 when the control unit 530 is mounted in the horizontal position. For example, the control unit 530 may be configured to decide to illuminate one of the first LEDs 586 when the control unit 530 is mounted in the horizontal position, and prevent subsequent adjustment of which LED is illuminated in response to the orientation sensing circuit (e.g., prevent subsequent illumination of the other one of the first LEDs 586). For example, the one of the first LEDs 586 that the control unit 530 decides to illuminate in the horizontal position may be predetermined (e.g., predefined) and/or may be dependent upon the last one of the first vertical orientation or the second vertical orientation in which the control unit 530 was oriented. In addition, the control unit 530 may determine the one of the first LEDs 586 to illuminate in the horizontal position in response to one or more actuations of the rotation portion 532 and/or the actuation portion 534. Further, the control unit 530 may determine the one of the first LEDs 586 to illuminate in the horizontal position in response to a digital message (e.g., in one or more wireless communication signals received via a wireless communication circuit). The control unit 530 may prevent subsequent adjustment of which LED is illuminated in response to the orientation sensing circuit while the control unit remains in the horizontal orientation. The control unit 530 may resume adjusting which LED is illuminated in response to the orientation sensing circuit The control unit 530 may be configured to decide which of the second LEDs 588 to illuminate when the control unit 530 is mounted in the horizontal position in a similar manner.

While the rotation portions 214, 332, 532 and the actuations portions 216, 334, 534 of the control device 200, the remote control device 310, and the remote control device 510 shown and described herein have a circular shape, the rotation portions and the actuation portions could have other shapes. For example, the rotation portions and the actuation portions may a rectangular shape, a square shape, a diamond shape, a triangular shape, an oval shape, a star shape, or any suitable shape. The front surface of the actuation portions 216, 334, 534 and/or the side surfaces of the rotation portions 214, 332, 532 may be planar or non-planar. The surfaces of the control device 200, the remote control device 310, and/or the remote control device 510 may be characterized by various colors, finishes, designs, patterns, etc.

Figure 9:
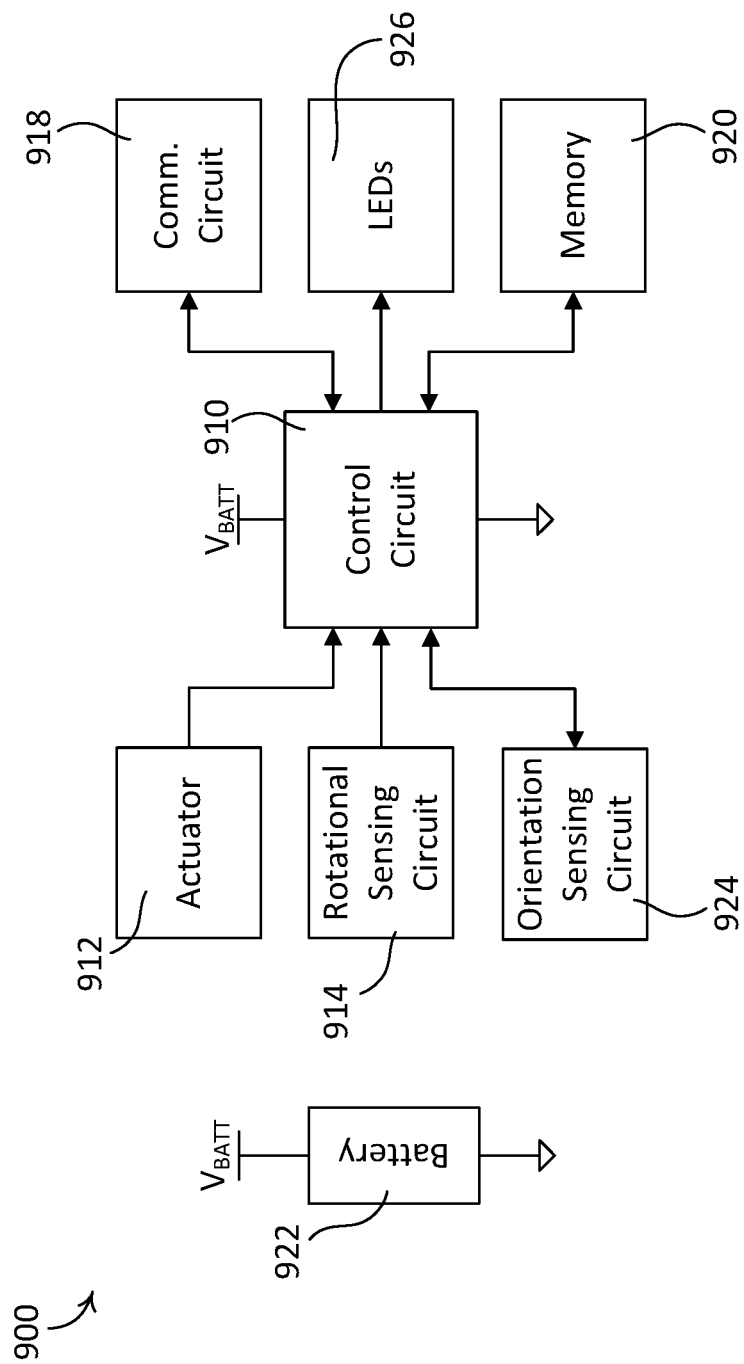
FIG. 9 shows a simplified block diagram of an example control device that may be deployed as a remote control device of the load control systems illustrated in FIGS. 1A and 1B.

FIG. 9 is a simplified block diagram of an example control device 900 (e.g., a remote control device), which may be deployed as the remote control device 116 in the load control system 100, the control device 200, the remote control device 310, and/or the remote control device 510. The control device 900 may include a control circuit 910, one or more actuators 912 (e.g., buttons and/or switches), a rotational sensing circuit 914, a wireless communication circuit 918, a memory 920, a battery 922, an orientation detection circuit 924, and/or one or more LEDs 926. The memory 920 may be configured to store one or more operating parameters (e.g., such as a preconfigured color scene or a preset light intensity) of the control device 900. The battery 922 may provide power to one or more of the components shown in FIG. 9.

The one or more actuators 912 may include a button or switch (e.g., a mechanical button or switch, or an imitation thereof) such as those described in association with the actuation portion 216 of the control device 200, the actuation portion 334 of the remote control device 310, and/or the actuation portion 534 of the remote control device 510. The actuators 912 may be configured to send respective input signals to the control circuit 910 in response to actuations of the actuators 912 (e.g., in response to movements of the actuators 912). The rotational sensing circuit 914 may be configured to translate a force applied to a rotating mechanism (e.g., such as the rotation portion 214 of the control device 200, the rotation portion 332 of the remote control device 310, and/or the rotation portion 532 of the remote control device 510) into an input signal and provide the input signal to the control circuit 910. The rotational sensing circuit 914 may include, for example, one or more magnetic sensors (such as Hall-effect sensors (HES), tunneling magnetoresistance (TMR) sensors, anisotropic magnetoresistance (AMR) sensors, giant magnetoresistance (GMR) sensors, reed switches, or other mechanical magnetic sensors), a mechanical encoder, an optical encoder, and/or a potentiometer (e.g., a polymer thick film or other resistive trace on a printed circuit board).

The control circuit 910 may be configured to translate the input signals provided by the actuators 912 and/or the rotational sensing circuit 914 into control data for controlling one or more electrical loads. The control circuit 910 may cause control signals (e.g., digital messages) including the control data to be transmitted to the electrical loads via the wireless communication circuit 918. For example, the wireless communication circuit 918 may transmit a control signal including the control data to the one or more electrical loads or to a central controller of the concerned load control system. The control circuit 910 may transmit a control signal including control data for turning one or more lighting loads on or off in response to an actuation of one of the actuators 914. The control circuit 910 may transmit one or more control signals including control data for adjusting the intensities of one or more lighting loads in response to rotations of the rotating mechanism determined from the rotational sensing circuit 914. The control circuit 910 may transmit one or more control signals including control data for adjusting the color (e.g., the color temperature) of one or more lighting loads in response to rotations of the rotating mechanism while one of the actuators 912 is being actuated. The control data may comprise commands for controlling the electrical loads and/or indications of actuations of the actuator 914 and/or the rotating mechanism.

The control circuit 910 may be configured to determine an orientation of the control device 900 in response to the orientation sensing circuit 924. The control device 900 may be mounted to a mounting assembly (e.g., the mounting assembly 530) in a first orientation (e.g., a first vertical orientation) and a second orientation (e.g., a second vertical orientation) that is, for example, approximately 180° from the first orientation. For example, the mounting assembly may be mounted over a toggle actuator of a light switch when the toggle actuator is in an up position in the first orientation (e.g., as shown in FIG. 8A) and when the toggle actuator is in a down position in the second orientation. The orientation sensing circuit 924 may comprise, for example, an accelerometer and/or a gyroscope. The control circuit 910 may be configured to determine the orientation (e.g., whether the control device 900 is in the first orientation or the second orientation) each time the control circuit wakes up from an off or sleep state. In addition, the control circuit 910 may be configured to determine that the control device 900 is mounted in a horizontal orientation in response to the orientation sensing circuit 924.

The control circuit 910 may illuminated the one or more LEDs 926 to provide simple feedback about various conditions. For example, the control circuit 910 may control the one or more LEDs to illuminate an illuminated portion (e.g., the illuminated portions 230a-230c) on the front surface 218 of the actuation portion 216 as shown in FIGS. 3A-3C and/or shine light from the rear side of the control module 200 onto the faceplate 212 as shown in FIG. 3D. In response to an actuation of one or more of the actuators 912 and/or an input received from the rotational sensing circuit 914, the control circuit 910 may control the one or more LEDs 926 to provide the simple feedback indicating the control circuit 910 is presently transmitting wireless signals via the wireless communication circuit 918. The control circuit 910 may be configured to determine which of the LEDs 926 to illuminate to provide the simple feedback in response to the orientation sensing circuit 924 (e.g., depending upon whether the control device 900 is in the first orientation or the second orientation). In addition, when the control device 900 is mounted in the horizontal orientation, the control circuit 910 may be configured to determine which of the LEDs 926 to illuminate and then prevent subsequent adjustment of which LED is illuminated in response to the orientation sensing circuit 924.

Figure 10:
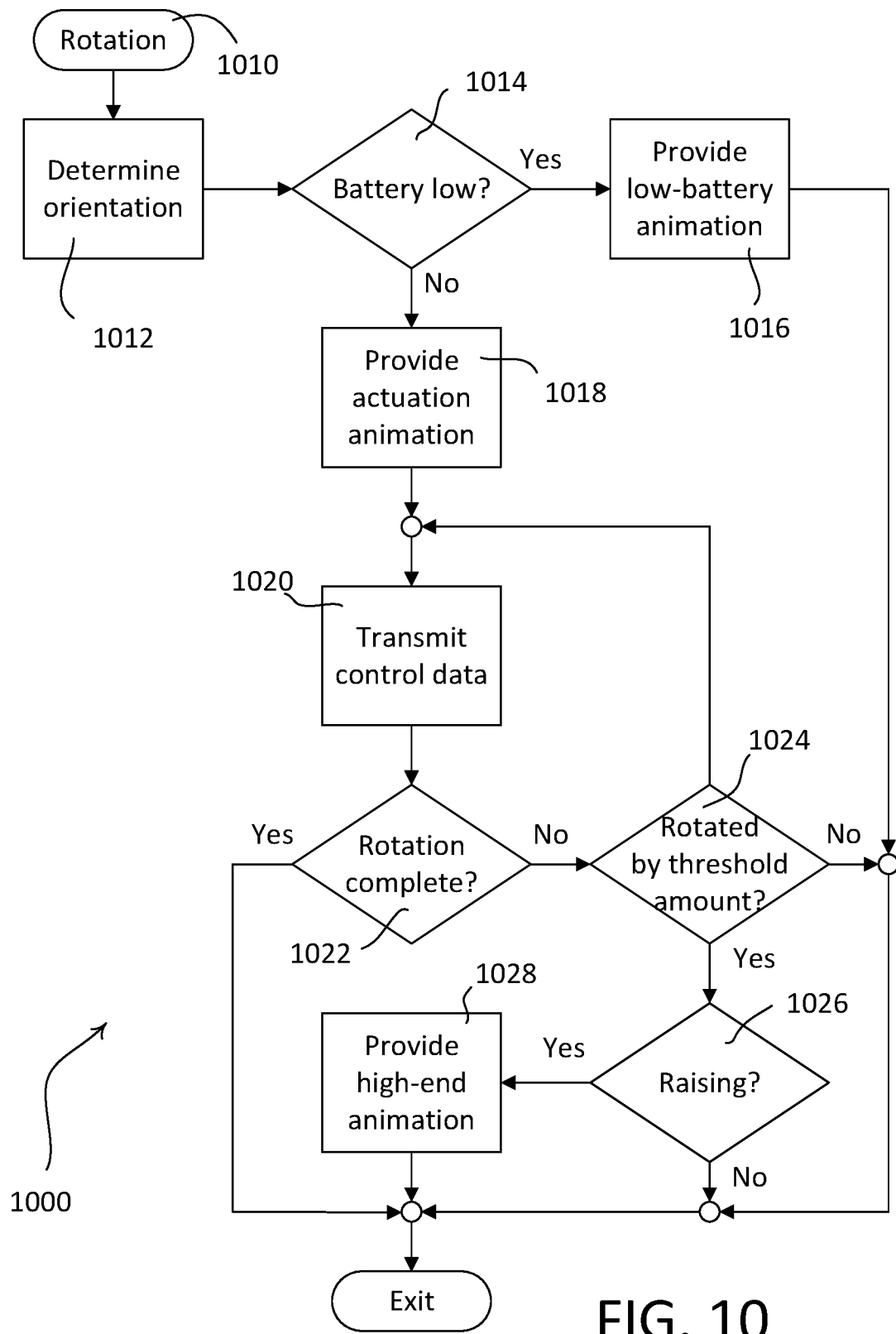
FIGS. 10-12 are flowcharts of example control procedures that may be executed by a control unit of a control device is response to rotations of a rotation portion.
Figure 11:
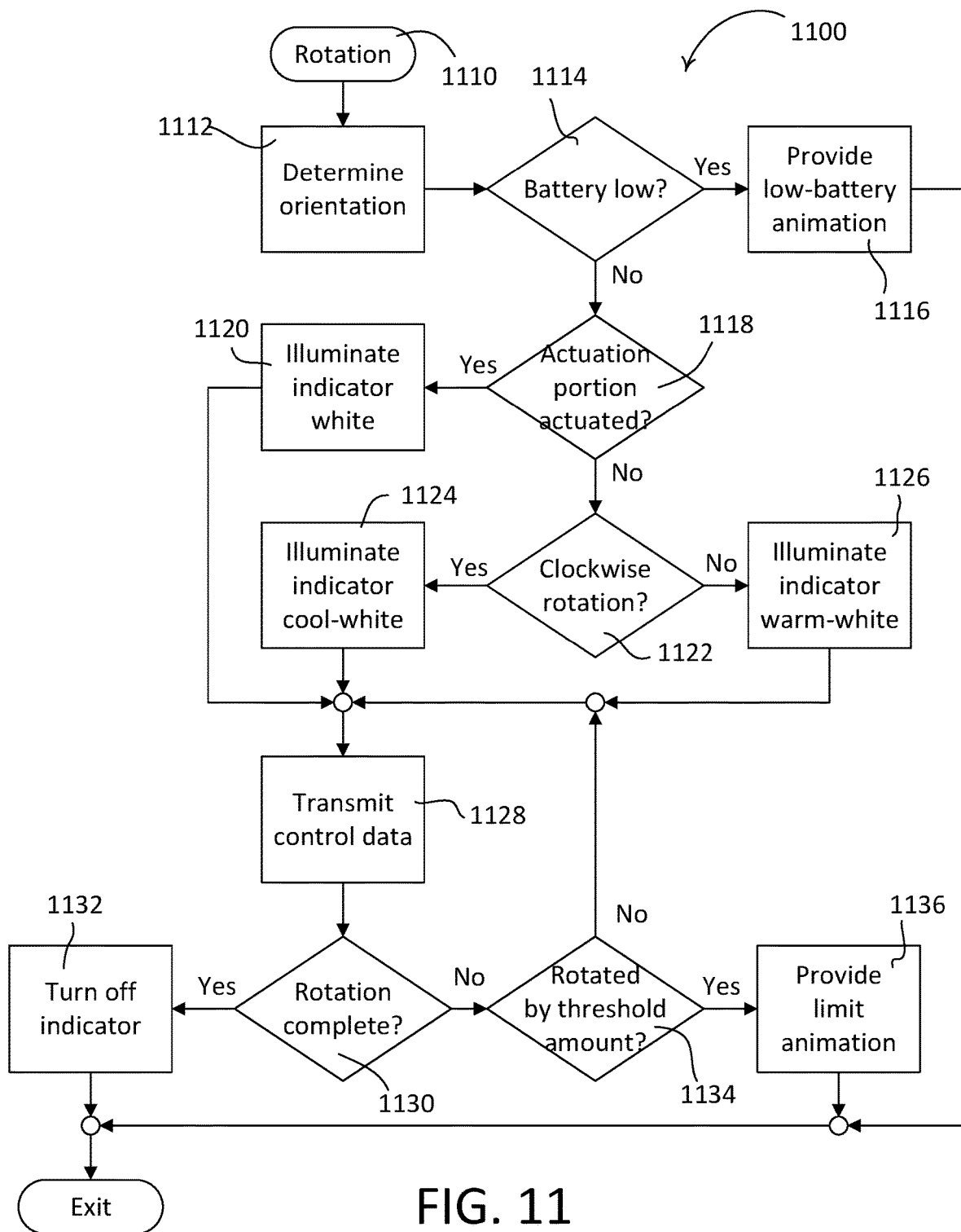
Figure 12:
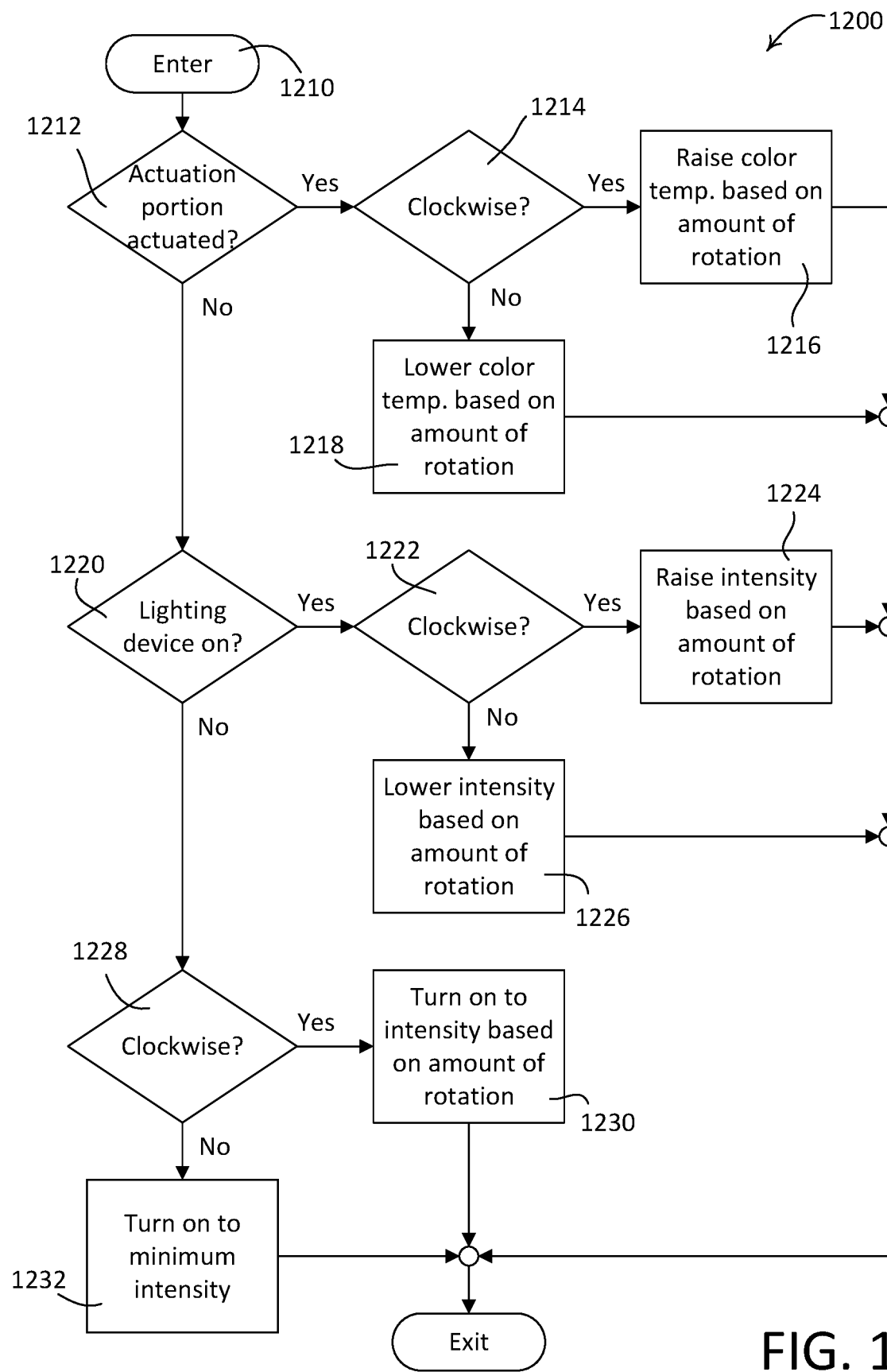

A user that is interfacing with a respective control device may be unaware of certain conditions that exist at the control device and/or other device within a load control system. For example, the user may be unaware of the state of the control device (e.g., the state of the control device's battery) and/or the type of control that the control device is configured to perform (e.g., adjusting intensity levels or color temperature). In addition, the user may be unaware of the effects that interfacing with the control device has on other devices within the load control system (e.g., lighting devices paired with eth control device). As a result, the user may be unable effectively interface with the control device. In order to provide the user with the ability to effectively interface with the control device, the control device may be configured to provide feedback (e.g., simple feedback and/or advanced feedback) to the user in response to a user interface event. FIGS. 10-12 illustrate example procedure for providing feedback to a user in response to a user interface event.

FIG. 10 is a flowchart of an example control procedure 1000 that may be executed by a control circuit of a control device (e.g., the control circuit 910 of the control device 900). For example, the control circuit may execute the control procedure 1000 at 1010 in response to the rotation of a rotation portion (e.g., the rotation portions 118, 214, 332, and/or 532). At 1012, the control circuit may determine an orientation of the control device (e.g., based on the orientation sensing circuit 924) to determine if the control device is in a first orientation or a second orientation. In addition, the control circuit may be configured to determine if the control device is in a horizontal orientation at 1012. At 1014, the control device may determine if a battery level of the control device is low. If the battery level of the control device is low at 1014, the control circuit may provide an indication of a low-battery condition at 1016, which may indicate the state of the control device to a user, and the control procedure 1000 may exit. In addition, the indication of the low-battery condition. For example, the control circuit may control one or more LEDs to illuminate a bottom portion of an actuation portion (e.g., the actuation portions 117, 216, 334, and/or 534) red. The control circuit may determine which of the LEDs to turn on in order to illuminate the bottom portion of the actuation portion in response to the orientation determined at 1012.

If the battery level of the control device is not low at 1014, the control circuit may provide an rotation animation at 1018. For example, the control circuit may control one or more of the LEDs to provide the actuation animation by illuminating an illuminated portion near the top of the actuation portion (e.g., the illuminated portion 230a shown in FIG. 3A). The control circuit may provide the actuation animation by turning an LED on and off once to (e.g., as shown in FIG. 3E) or controlling an LED to generate a "heartbeat" animation (e.g., as shown in FIG. 3F). The control circuit may determine which of the LEDs to control in order to illuminate the illuminated portion near the top of the actuation portion in response to the orientation determined at 1012.

At 1020, the control circuit may transmit control data for controlling at least one lighting device. For example, the control circuit may transmit one or more digital messages that include a "move-to-level" command at 1020 for raising and/or lowering the intensity of lighting device in response to rotations of the rotation portion. If the rotation is complete at 1022, the control procedure 1000 may exit. If the rotation is not complete at 1022, the control circuit may determine if the rotation portion has been rotated (e.g., continuously rotated) by a predetermined threshold amount (e.g., approximately 210°) at 1024. If not, the control circuit may transmit the control data again at 1020 (e.g., at a periodic rate). If the rotation portion has been rotated by the predetermined threshold amount at 1024 and the rotations of the rotation portion are for raising the intensity of the lighting device at 1026 (e.g., clockwise rotation), the control circuit may provide a high-end animation to indicate that the lighting device has reached a high-end intensity at 1028, before the control procedure 1000 exits. For example, rotation of the rotation portion by the predetermined threshold amount may result in a change of the intensity level of the lighting device from the low-end intensity to the high-end intensity. The control circuit may provide the high-end animation at 1028 by blinking or fluttering the illuminated portion of the actuation portion (e.g., turning on and off rapidly numerous times over a period of time).

FIG. 11 is a flowchart of another example control procedure 1100 that may be executed by a control circuit of a control device (e.g., the control circuit 910 of the control device 900). For example, the control circuit may execute the control procedure 1100 at 1110 in response to the rotation of a rotation portion (e.g., the rotation portions 118, 214, 332, and/or 532). At 1112, the control circuit may determine an orientation of the control device (e.g., based on the orientation sensing circuit 924) to determine if the control device is in a first orientation or a second orientation. In addition, the control circuit may be configured to determine if the control device is in a horizontal orientation at 1112. If a battery level of the control device is low at 1114, the control circuit may provide an indication of a low-battery condition at 1116, and the control procedure 1000 may exit. For example, the control circuit may control one or more LEDs to illuminate a bottom portion of an actuation portion (e.g., the actuation portions 117, 216, 334, and/or 534) red. The control circuit may determine which of the LEDs to turn on in order to illuminate the bottom portion of the actuation portion in response to the orientation determined at 1112.

If the battery level of the control device is not low at 1114, the control circuit may determine if the actuation portion is being actuated while the rotation portion is being rotated at 1118. If the actuation portion is not being actuated while the rotation portion is being rotated at 1118, the control circuit may provide illuminate an indicator, such as an illuminated portion near the top of the actuation portion (e.g., the illuminated portion 230a shown in FIG. 3A) at 1120. For example, the control circuit may control one or more of the LEDs to illuminate the illuminated portion white at 1120. If the actuation portion is being actuated while the rotation portion is being rotated at 1118 and the rotation is a clockwise rotation at 1122 (e.g., to raise a color temperature of the lighting device), the control circuit may illuminate the indicator (e.g., the illuminated portion of the actuation portion) a cool-white color (or blue) at 1124. If the actuation portion is being actuated while the rotation portion is being rotated at 1118 and the rotation is a counter-clockwise rotation at 1122 (e.g., to lower a color temperature of the lighting device), the control circuit may illuminate the indicator (e.g., the illuminated portion of the actuation portion) a warm-white color (or red) at 1126.

For example, the control circuit may control one or more of the LEDs to illuminate the illuminated portion white at 1120. If the actuation portion is being actuated while the rotation portion is being rotated at 1118 and the rotation is a clockwise rotation at 1122 (e.g., to raise a color temperature of the lighting device), the control circuit may illuminate the indicator (e.g., the illuminated portion of the actuation portion) a first color (e.g., a cool-white or blue color) at 1124. If the actuation portion is being actuated while the rotation portion is being rotated at 1118 and the rotation is a counter-clockwise rotation at 1122 (e.g., to lower a color temperature of the lighting device), the control circuit may illuminate the indicator (e.g., the illuminated portion of the actuation portion) a second color (e.g., a warm-white or red color) at 1126.

After illuminating the indicator at 1120, 1124, or 1126, the control circuit may transmit control data for controlling the lighting device at 1128. For example, if the rotation of the rotation portion is for raising or lowering the intensity of the lighting device, the control circuit may transmit a "move-to-level" command at 1128 for adjusting the intensity of lighting device in response to rotation of the rotation portion. If the rotation of the rotation portion is for raising or lowering the color temperature of the lighting device, the control circuit may transmit a "move-to-color-temperature" command at 1128 for adjusting the color temperature of lighting device in response to rotation of the rotation portion. If the rotation is complete at 1130, the control circuit may turn off the indicator (e.g., by turning off the LEDs illuminating the illuminated portion of the actuation portion) at 1132, and the control procedure 1100 may exit.

If the rotation is not complete at 1130, the control circuit may determine if the rotation portion has been rotated by a predetermined threshold amount (e.g., approximately 210°) at 1134. If the rotation portion has been rotated by less than the predetermined threshold amount, the control circuit may transmit the control data again at 1128 (e.g., at a periodic rate). If the rotation portion has been rotated by the predetermined threshold amount at 1134, the control circuit may provide a limit indication (e.g., a limit animation) to indicate that the lighting device has reached a limit (e.g., a high-end intensity, a low-end intensity, a cool-white color temperature limit, and/or a warm-white color temperature limit) at 1136, before the control procedure 1100 exits. For example, rotation of the rotation portion by the predetermined threshold amount may result in a change of the intensity level of the lighting device between the low-end intensity and the high-end intensity, and/or between the cool-white color temperature limit and the warm-white color temperature limit. The control circuit may provide the limit animation at 1136 by blinking or fluttering the illuminated portion of the actuation portion (e.g., turning on and off rapidly numerous times over a period of time).

FIG. 12 is a flowchart of another example control procedure 1200 that may be executed by a control circuit of a control device (e.g., a control circuit of the remote control device 116 in the load control system 100, a control circuit of a system controller, such as the hub device 180, and/or the control circuit 910 of the control device 900). For example, the control circuit may execute the control procedure 1200 at 1210 in response to the rotation of a rotation portion (e.g., the rotation portions 118, 214, 332, and/or 532) and/or at 1128 of the control procedure 1100 of FIG. 11. In addition, the control circuit may execute the control procedure 1200 in response to receiving control data indicating a rotation of a rotation portion of an external device (e.g., the control circuit of the hub device 180 may execute the control procedure 1200 in response to receiving a digital message including control data indicating a rotation of the rotation portion 118 of the remote control device 116). During the control procedure 1200, the control circuit may generate and/or transmit control data for controlling at least one lighting device (e.g., the lighting devices 112a, 112b, 122).

At 1212, the control circuit may determine if an actuation portion (e.g., the actuation portions 117, 216, 334, and/or 534) is being actuated while the rotation portion is being rotated. If the actuation portion is being actuated while the rotation portion is being rotated at 1212 and the rotation portion is being rotated clockwise at 1214, the control circuit may generate and/or transmit control data for raising the color temperature of the lighting device at 1216. If the actuation portion is being actuated while the rotation portion is being rotated at 1212 and the rotation portion is being rotated counter-clockwise at 1214, the control circuit may generate and/or transmit control data for lowering the color temperature of the lighting device at 1218. For example, the control circuit may adjust the color temperature of the lighting device at 1216 and 1218 by an amount dependent upon the amount of rotation of the rotation portion.

If the actuation portion is not being actuated while the rotation portion is being rotated at 1212, the control device may determine if the lighting device is on at 1220. If the lighting load is on at 1220 and the rotation portion is being rotated clockwise at 1222, the control circuit may generate and/or transmit control data for raising the intensity of the lighting device at 1224. If the lighting load is on at 1220 and the rotation portion is being rotated counter-clockwise at 1222, the control circuit may generate and/or transmit control data for lowering the intensity of the lighting device at 1226. For example, the control circuit may adjust the intensity of the lighting device at 1224 and 1226 by an amount dependent upon the amount of rotation of the rotation portion. If the lighting load is off at 1220 and the rotation portion is being rotated clockwise at 1228, the control circuit may generate and/or transmit control data for turning on the lighting device to an intensity determined by the amount of rotation of the rotation portion at 1230. If the lighting load is off at 1220 and the rotation portion is being rotated counter-clockwise at 1228, the control circuit may generate and/or transmit control data for turning on the lighting device to a low-end intensity (e.g., a minimum intensity). The control circuit may not adjust the intensity of the lighting device from the low-end intensity in response to continued rotation of the rotation portion in the counter-clockwise direction.

What is claimed is:

1. A control device configured for use in a load control system to control an external lighting device, the control device comprising:
    a base portion;
        a control unit configured to connect to the base portion, the control unit comprising a rotation portion rotatable with respect to the base portion, an actuation portion comprising a front surface and received in an opening of the rotation portion, a light source, and a control circuit;
        wherein the light source is configured to illuminate at least an illuminated portion on the front surface of the actuation portion, and the control circuit is configured to:
        in response to an actuation of the actuation portion, determine first control data for turning the lighting device on or off, control the light source to illuminate the illuminated portion of the actuation portion, and transmit control signals including the first control data;
        in response to a rotation of the rotation portion, determine second control data for adjusting an intensity of the lighting device, control the light source to illuminate the illuminated portion of the actuation portion, and transmit control signals including the second control data; and
        control the light sources to blink the illuminated portion when the intensity of the lighting device has reached a limit in response to rotation of the rotation portion.

2. The control device of claim 1, wherein the control circuit is further configured to:
    determine that the intensity of the lighting device has reached the limit, wherein it is determined that the lighting device has reached the limit when the rotation portion has been rotated by a first amount in a first direction, or when the rotation portion has been rotated by a second amount in a second direction.

3. The control device of claim 2, wherein the first direction is clockwise and the control unit is configured to control the light sources to blink the illuminated portion when the intensity of the lighting device has reached a high-end intensity.

4. The control device of claim 2, wherein the second direction is counter-clockwise and the intensity of the lighting device the control unit is configured to control the light sources to blink the illuminated portion when has reached a low-end intensity.

5. The control device of claim 1, wherein the control unit further comprises a communication circuit configured to receive a message indicating that the lighting device has reached the limit.

6. The control device of claim 1, wherein the control circuit is further configured to keep track of an intensity of the lighting device and control the light sources to blink the illuminated portion when the intensity of the lighting device has reached the limit.

7. The control device of claim 6, wherein the control circuit is further configured to control the light source to continuously illuminate the illuminated portion while the actuation portion is being actuated.

8. The control device of claim 1, wherein the control circuit is further configured to control the light source to continuously illuminate the illuminated portion for a period of time after detecting the actuation of the actuation portion.

9. The control device of claim 1, wherein the control circuit is further configured to control the light source to illuminate the illuminated portion red to indicate a low-battery condition after detecting the actuation of the actuation portion.

10. The control device of claim 1, wherein the control circuit is further configured to:
    determine the first control data for adjusting a color temperature of the one or more lighting devices in response to the rotation of the rotation portion;
    illuminate the illuminated portion a first color when the rotation portion is rotated in a first direction; and
    illuminate the illuminated portion a second color when the rotation portion is rotated in a second direction,
    wherein the illuminated portion is illuminated a blue color when the rotation portion is rotated to adjust the color temperature towards a cool-white color, and the illuminated portion is illuminated a red color when the rotation portion is rotated to adjust the color temperature towards a warm-white color.

11. The control device of claim 10, wherein the control circuit is configured to determine the first control data for adjusting the color temperature of the one or more lighting devices when the actuation portion is being actuated while the rotation portion is being rotated.

12. The control device of claim 1, further comprising:
    a mask located between the light source and the actuation portion, the mask comprising an aperture through which light emitted by the light source may shine onto the actuation portion.

13. The control device of claim 1, wherein the illuminated portion of the actuation portion is located near the top of the actuation portion.

14. The control device of claim 13, wherein the control unit further comprises a first light source for illuminating the illuminated portion at the top of the actuation portion when the control unit is mounted to the base portion in a first orientation, and a second light source for illuminating the illuminated portion at the top of the actuation portion when the control unit is mounted to the base portion in a second orientation.

15. The control device of claim 14, wherein the control circuit is further configured to determine whether the control unit is mounted to the base portion in the first orientation or the second orientation in response to an orientation sensing circuit, the control circuit configured to determine which of the first and second light sources to control in response to the orientation sensing circuit.

16. The control device of claim 15, wherein, when the control unit is mounted in a horizontal orientation, the control device is configured to determine which of the first and second light sources to control, and then prevent subsequent adjustment of which of the first and second light sources is controlled in response to the orientation sensing circuit.

17. The control device of claim 1, wherein the base portion is configured to be mounted over a mechanical switch.

18. The control device of claim 1, wherein the control circuit is configured to control the light source to illuminate the illuminated portion differently depending upon which one of the actuation portion and the rotation portion was actuated.

19. A control device configured for use in a load control system to control an external lighting device, the control device comprising:
 a base portion;
 a control unit configured to connect to the base portion, the control unit comprising a rotation portion rotatable with respect to the base portion, a visible indicator, a plurality of light sources configured to illuminate the visible indicator, and a control circuit configured to, in response to a rotation of the rotation portion, determine control data for controlling an intensity of the lighting device, control the light sources to illuminate at least a portion of the visible indicator to indicate an intensity the lighting device, and transmit control signals including the control data;
 wherein the control circuit is configured to control the plurality of light sources to blink the visible indicator when the intensity of the lighting device has reached a limit.

20. The control device of claim 19, wherein the control unit further comprises a communication circuit configured to receive a message indicating that the lighting device has reached the limit, and wherein the control circuit is further configured to provide the limit indication on the visible indicator in response to receiving the message indicating that the intensity of the lighting device has reached the limit.

21. The control device of claim 19, wherein the control circuit is further configured to keep track of the intensity of the lighting device and provide the first indication on the illuminated portion of the actuation portion when the intensity of the lighting device has reached the limit.

22. The control device of claim 19, wherein the visible indicator comprises a circular light bar located between the rotation portion and the actuation portion.

23. The control device of claim 19, wherein the limit comprises a high-end intensity or a low-end intensity.

24. The control device of claim 19, wherein the base portion is configured to be mounted over a mechanical switch.

* * * * *